(12) United States Patent
Middler et al.

(10) Patent No.: US 7,298,370 B1
(45) Date of Patent: Nov. 20, 2007

(54) DEPTH ORDERING OF PLANES AND DISPLAYING INTERCONNECTS HAVING AN APPEARANCE INDICATING DATA CHARACTERISTICS

(75) Inventors: Mitchell Scott Middler, Hermosa Beach, CA (US); Ron Brinkmann, Hermosa Beach, CA (US); Peter Warner, Paris (FR)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 11/107,328

(22) Filed: Apr. 16, 2005

(51) Int. Cl.
*G06T 15/40* (2006.01)
*G06T 11/20* (2006.01)
(52) U.S. Cl. ..................... 345/421; 345/440
(58) Field of Classification Search .............. None
See application file for complete search history.

(56) References Cited

U.S. PATENT DOCUMENTS 6,018,348 A * 1/2000 Sprague .................. 345/421
6,169,550 B1 * 1/2001 Jain ...................... 345/421

OTHER PUBLICATIONS

Foley, James D., "The z-Buffer Algorithm", "List-Priority Algorithms, and The Depth-Sort-Algorithm", (BOOK)—Computer Graphics Principles and Practice, 2nd Edition in C, (1997) pp. 668-675.*

\* cited by examiner

*Primary Examiner*—Mark Zimmerman
*Assistant Examiner*—Gene Tseng
(74) *Attorney, Agent, or Firm*—Adeli Law Group PLC

(57) ABSTRACT

A method for determining a depth ordering between two planes in a 3D workspace of an application is provided. The method includes projecting vectors from a reference position through points of interest on the planes, determining corresponding points on the other plane, determining a number of points of interest on a first plane having a depth lower than its corresponding point and a number of points of interest on a second plane having a depth lower than its corresponding point, and setting the depth ordering based on these numbers. A method for displaying interconnects between nodes of a tree displayed in an application is provided. A node represents a multimedia item or a function and an interconnect represents data passed between two nodes. The method includes displaying an interconnect in the tree having an appearance indicating at least one characteristic of the data being passed between two nodes.

9 Claims, 26 Drawing Sheets

DEPTH ORDERING OF PLANES AND DISPLAYING INTERCONNECTS HAVING AN APPEARANCE INDICATING DATA CHARACTERISTICS

FIELD OF THE INVENTION

The invention relates to depth ordering of planes and displaying interconnects having an appearance indicating data characteristics.

BACKGROUND OF THE INVENTION

Compositing and effects applications (such as Shake® by Apple Computer, Inc.) receive and process multimedia items (e.g., text, image, video, audio, etc.) to produce a multi-layered composited output. Such applications can import and composite multimedia items and allow transformations of multimedia items that change characteristics (e.g., position, size, shape, and rotation) using transformations such as pan/move, rotate, scale, etc. A graphical user interface (GUI) used in these applications display multimedia items in a three dimensional (3D) workspace and allows a user to select and manipulate the displayed multimedia items. Keyboards or cursor controlling devices (e.g., computer mouse) are used to interact with the GUI to select and manipulate multimedia items in the 3D workspace.

SUMMARY OF THE INVENTION

In some embodiments, a method for determining a depth ordering between first and second planes in a three dimensional workspace of a compositing application is provided where the depth ordering is in relation to a reference position (e.g., virtual camera) in the workspace. The method includes projecting vectors from the reference position through predetermined points of interest on the first and second planes, determining, for each point of interest on a particular plane, a corresponding point on the other plane that is intersected by the vector intersecting the point of interest on the particular plane, determining a first number comprising the number of points of interest on the first plane having a depth coordinate lower than its corresponding point on the second plane and a second number comprising the number of points of interest on the second plane having a depth coordinate lower than its corresponding point on the first plane, and setting the depth ordering to reflect that the first plane is closer to the reference position if the first number is greater than the second number and setting the depth ordering to reflect that the first plane is farther from the reference position if the first number is less than the second number.

In some embodiments, the points of interest comprise corner and center points of the planes. In some embodiments, the method further includes determining a first distance comprising the distance between the center point of the first plane and its corresponding point on the second plane and a second distance comprising the distance between the center point of the second plane and its corresponding point on the first plane; and setting the depth ordering to reflect that the first plane is closer to the reference position if the first distance is greater than the second distance and setting the depth ordering to reflect that the first plane is farther from the reference position if the first distance is less than the second distance.

In some embodiments, a method for displaying interconnects that connect nodes of a process tree displayed in a multimedia application is provided. A node represents a multimedia item or a function being performed on at least one multimedia item and an interconnect represents data being passed between a pair of nodes that the interconnect connects. The method includes displaying at least a first interconnect in the process tree having an appearance that indicates at least one characteristic of the data being passed between a pair of nodes that the first interconnect connects.

In some embodiments, color of the first interconnect, the line patterning of the first interconnect, or both, are used to indicate the at least one characteristic of the data. In some embodiments, the data is image data and the appearance of the first interconnect indicates the color bit depth or channel configuration of the image data. In some embodiments, the appearance of the first interconnect and the data characteristics that the appearance indicate are user configurable.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Several embodiments are described below by reference to compositing applications. The descriptions relating to compositing applications, however, are for illustrative purposes only and one of ordinary skill in the art will realize and that the processes of the below embodiments can be applied to any multimedia application.

As used herein, a multimedia item is sometimes referred to as a layer or plane. As used herein, a transform is sometimes referred to as a function, operation, or process that is performed on a multimedia item. As used herein, a workspace is a virtual 3D layout where a user can import and manipulate one or more two dimensional (2D) planes. In the workspace, the user can also manipulate a virtual camera that provides a view of the workspace, the view being used to composite and render the planes of the workspace.

I. Compositing Multimedia Items

Process Tree and Multi-Plane Nodes

In some embodiments, multimedia items are composited by multimedia applications that represent the compositing process using a process tree. In these embodiments, the process tree that represents various multimedia items, transforms performed on the multimedia items, and the relationships between the items and transforms. The process tree offers an intuitive, nonlinear process that makes building and modifying complex composites fast and easy. The process tree gives users access to any part of the composite at any time and allows users to make creative and technical decisions at any point in the production process. In this way, contextual viewing is always available, allowing users to adjust background elements while monitoring the entire composite. This provides a schematic method for creating and modifying effects, with all stages intact and accessible at any time. This tree-based method has a significant advantage over layer-based methods because changes can be made at any stage in the tree.

Figure 1:
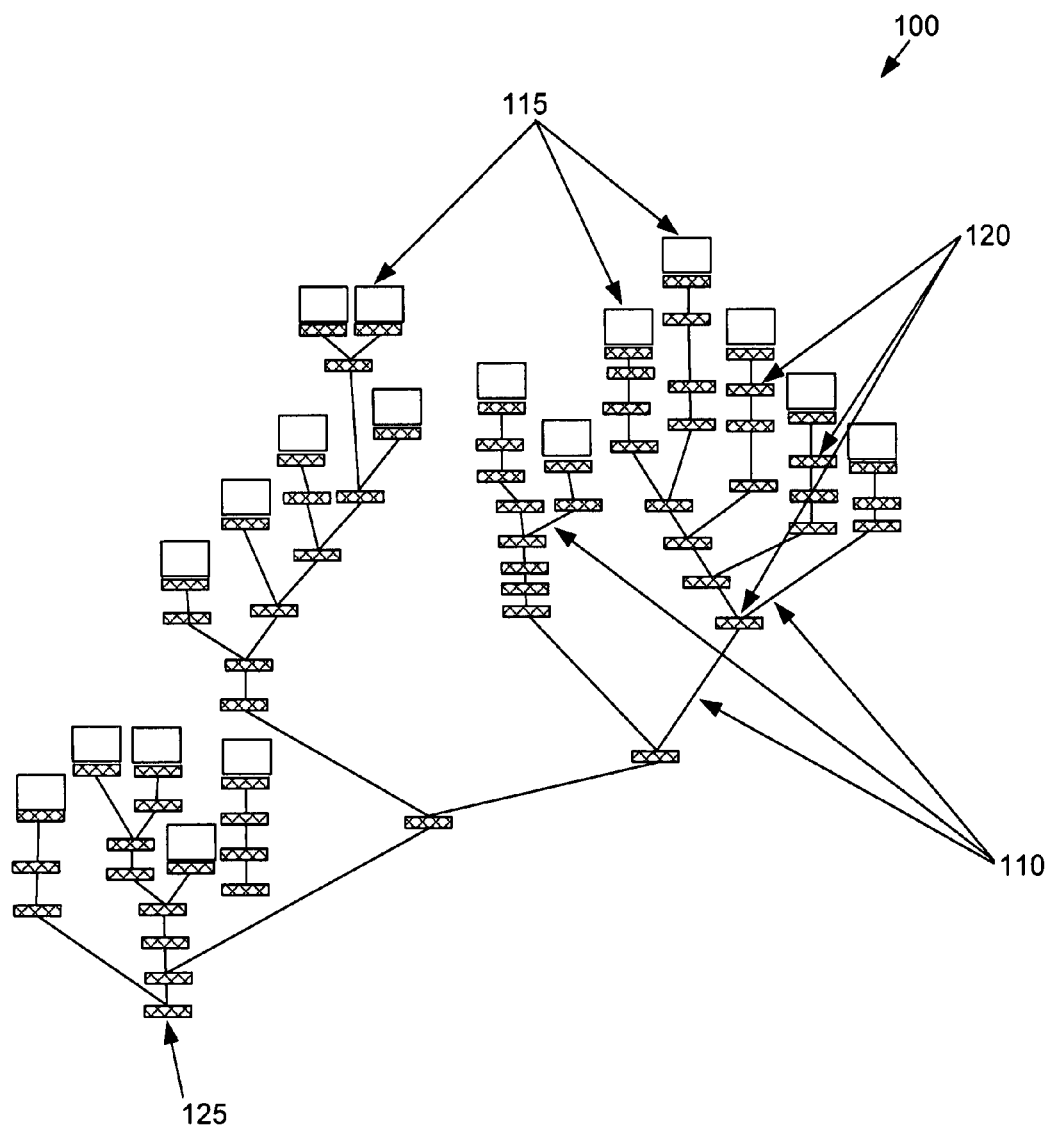
FIG. 1 illustrates an example of a process tree comprising a set of nodes and a set of interconnects between the nodes.

FIG. 1 illustrates an example of a process tree 100 comprising a set of nodes and a set of interconnects 110 between the nodes. Leaf nodes 115 (i.e., nodes not receiving inputs from other nodes) comprise multimedia items (e.g., text, image, video, audio, etc.). and non-leaf nodes 120 comprise functions/transforms performed on one or more multimedia items. Non-leaf nodes receive one or more inputs from other nodes and outputs to another node (except for a root node). A root node 125 (i.e., a node that has no output) receives, directly or indirectly, an output from each of the other nodes of the process tree 100 and is the final composited output of the process tree.

Figure 2:
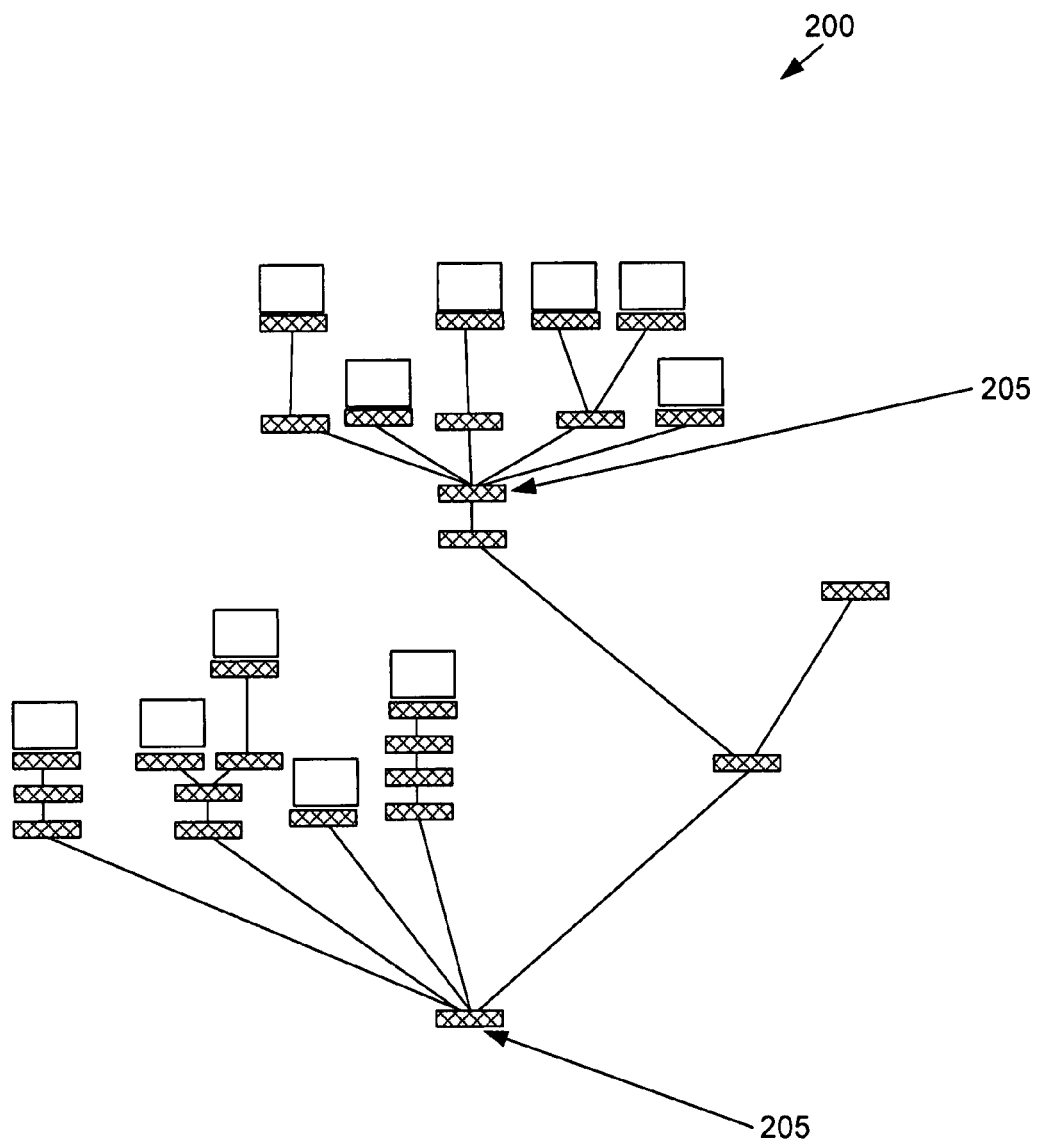
FIG. 2 illustrates an example of a process tree having multi-plane nodes.

In some embodiments, the process tree includes the use of novel multi-plane/multi-layer nodes that can each receive one or more plane inputs (up to an infinite number of plane inputs). FIG. 2 illustrates an example of a process tree 200 having novel multi-plane nodes 205. The process tree 200 is equivalent to the process tree 100 shown in FIG. 1 but is simplified by use of the multi-plane nodes 205. The multi-plane node provides a compositing environment for positioning two dimensional (2D) items/planes within the 3D workspace. Using the multi-plane node, a user, for example, can arrange multiple items/planes within the 3D workspace for easy simulation of perspective, parallax, and other depth effects.

Multi-Pane Interface

In some embodiments, a multi-plane node is displayed in a novel multi-pane display interface. Each pane of the multi-pane interface can be set to display a particular view of the workspace. Different views provide different viewing angles of the workspace to assist a user in positioning items/planes within the 3D workspace (having XYZ coordinate axes comprising a 3D coordinate system). For example, a front view provides a front angle to the workspace and is useful for transforming a plane's X and Y pan, angle, and scale parameters; a top view provides a top angle to the workspace and is useful for transforming a plane's X and Z pan, angle, and scale parameters; and a side view provides a side angle to the workspace and is useful for transforming a plane's Y and Z pan, angle, and scale parameters.

In some embodiments, a perspective view of the workspace is also available. The perspective view is useful for transforming a plane's X, Y, and Z pan, angle, scale, and rotation parameters. The perspective view provides a 3D simulation effect by graphically approximating on a 2D planar surface the images of the multimedia items so as to approximate 3D visual perception. In perspective view, items that are closer to the virtual camera (having lower Z coordinate values) are shown to be larger than items of the same size that are farther from the virtual camera (having higher Z coordinate values). As such, the dimensions of items in the perspective view may not be equal to the dimensions of the same items in non-perspective views and may appear "distorted" in the perspective view relative to the non-perspective views. As used herein, a non-perspective view is a view that does not provide the 3D simulation effect of a perspective view. Examples of non-perspective views are views that are orthographic, such as the front, side, and top views.

The different views also assist a user in positioning a virtual camera within the 3D workspace. The virtual camera controls the scope of the final output of the multi-plane node. In some embodiments, the distance from the virtual camera determines the Z coordinates of an item in the workspace where lower Z coordinate values indicate that the item is closer to the virtual camera than higher Z coordinate values. In some embodiments, the view of the virtual camera is also provided as an available view in the multi-pane interface and is referred to as the "Camera1" view. The 3D workspace as shown through the "Camera1" view represents the final composited output of the multi-plane node and as such, provides a perspective view of the workspace.

Figure 3:
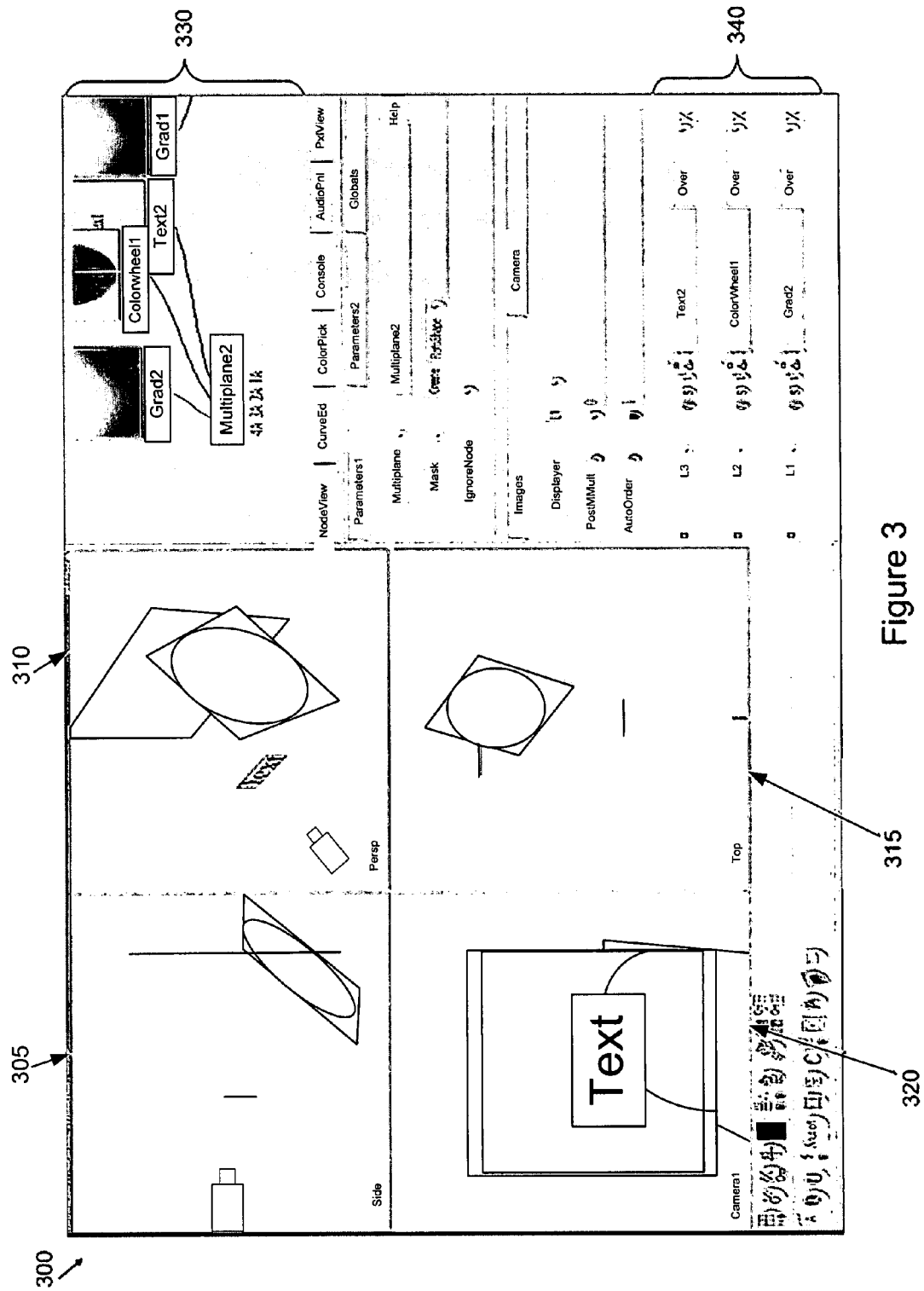
FIG. 3 shows an example of a multi-pane interface of a multi-plane node having four panes.

FIG. 3 shows an example of a multi-pane interface 300 of a multi-plane node having four panes. A first pane 305 displays a side view, a second pane 310 displays a perspective view, a third pane 315 displays a top view, and a fourth pane 320 displays a "Camera1" view of the 3D workspace. As shown in FIG. 3, the multi-pane interface 300 also displays a node graph 330 showing the various nodes from which the multi-plane node receives inputs.

The multi-pane interface 300 also displays a plane ordering interface 340 that allows a user to specify the Z-depth ordering of the planes in the 3D workspace (i.e., the distance from the virtual camera). In some embodiments, the Z-depth ordering of the planes specified in the plane ordering interface 340 is used to help determine whether one plane is in front of another (as discussed below). The Z-depth ordering of the planes affects the rendering of the planes in the final output as a first plane may be occluded (visually blocked) by a second plane considered to be in front of the first plane.

Transforms and Controls

Through interaction with a view shown in the multi-pane interface, a user can select any plane shown in the view (e.g., through use of a cursor controlling device) and specify 3D transforms (i.e., functions or processes) to be performed on the selected plane. Such transformations occur within the actual 3D workspace and can occur along any specified axis (X, Y, or Z) of the workspace. Numerically, all transformations occur relative to the origin point (0,0,0) of a global coordinate space (discussed below) of the workspace. Such transforms include, for example, moving/panning, rotating, scaling, etc.

Figure 4:
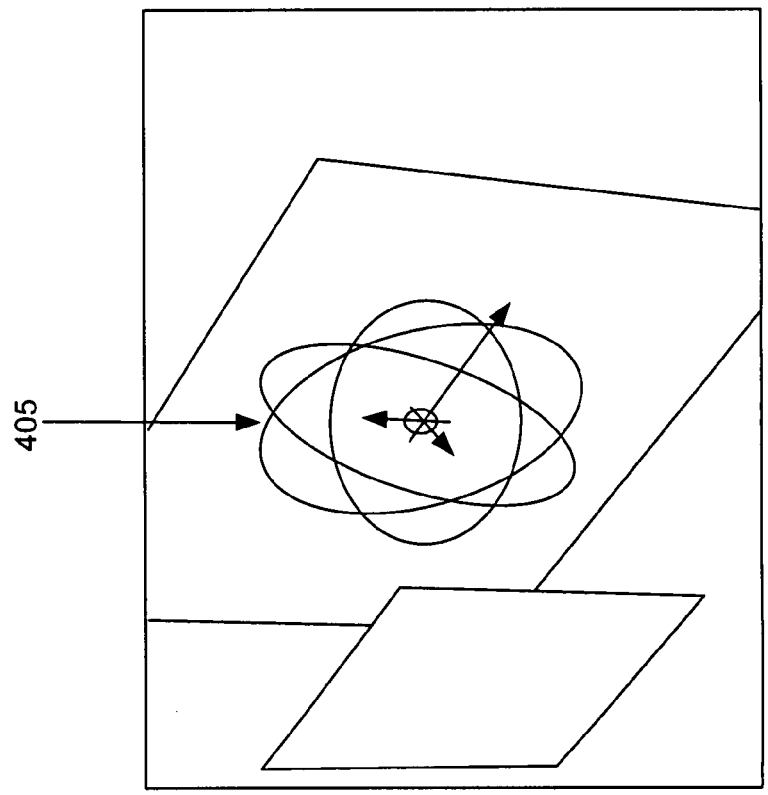
FIG. 4 shows an example of onscreen controls revealed for performing a rotation transform around the X, Y, or Z axis of a selected plane.

In some embodiments, upon selecting a plane in a view, particular onscreen transform controls for the plane are revealed and superimposed over the plane. FIG. 4 shows an example of onscreen controls 405 that may be revealed for performing a rotation transform around the X, Y, or Z axis of a selected plane. In some embodiments, the rotation onscreen controls 405 are different colored ellipses superimposed over a selected plane, wherein each axis is represented by a different colored ellipse.

Figure 5:
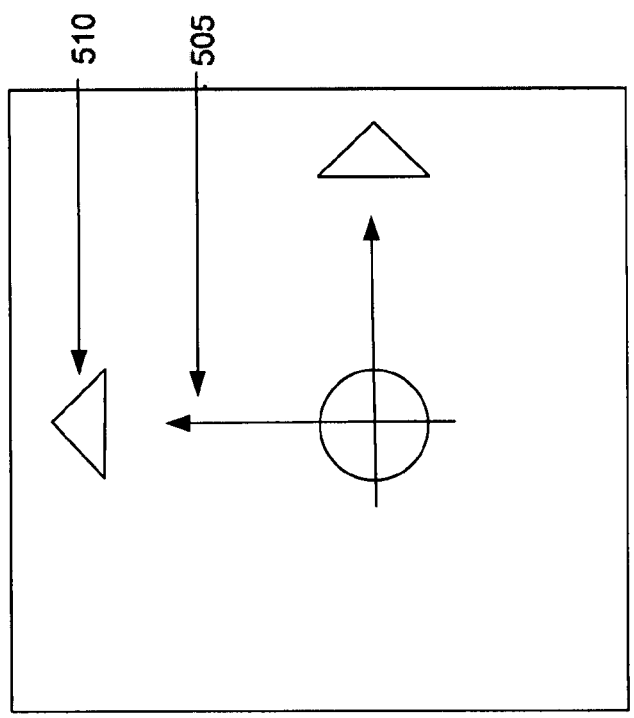
FIG. 5 shows an example of global and local sets of onscreen controls revealed for performing a move/pan transform along the X, Y, or Z axis of a selected plane.

FIG. 5 shows an example of two sets of onscreen controls that may be revealed for performing a move/pan transform along the X, Y, or Z axis of a selected plane. The first set of pan onscreen controls 505 (the set of inside arrows) allow panning of the selected plane in relation to a global coordinate system of the 3D workspace. The second set of pan onscreen controls 510 (the set of outside triangles) allow panning of the selected plane in relation to a local coordinate system of the selected plane.

II. Hot Key Selection of Transforms and Activation of Onscreen Control Guidelines After revealing particular onscreen controls of an item selected through the GUI of a multimedia application, the user can specify a particular transform/function (e.g., global or local pan, rotate, scale, etc.) and the manner of the particular transform/function to be applied to the selected item. As used herein, the manner of a transform/function specifies a particular aspect of the transform/function and the extent/degree of the particular aspect to be applied to the selected item. For example, the manner of a transform may specify along which axis (X, Y, or Z) a transform applies and to what amount the transform will be along the axis.

For example, through use of a cursor controlling device, the user can select a triangle corresponding to the Y axis in the set of local pan onscreen controls 510 to select a local pan transform along the Y axis and then move the selected triangle a particular distance to specify the extent of the local pan transform along the Y axis to be applied to the selected item. However, after selection of an item through the GUI of the multimedia application, it can be difficult for the user to specify the type and manner of a transform to be applied to the selected item when the item is small or is in a crowded area of the GUI.

In some embodiments, an easier method for specifying a transform/function to be applied to a selected item and the manner of the transform is provided. In some embodiments, hot keys (keyboard inputs) are used to select transforms and activate a set of onscreen control guidelines. Each hot key is associated with a particular transform (e.g., pan, rotate, scale, etc.) and input of the hot key selects the transform associated with the hot key. Each hot key is also associated with a particular set of control guidelines and input of the hot key also activates the set of control guidelines associated with the hot key (i.e., causes the associated set of control guidelines to be displayed in the GUI). In some embodiments, different sets of control guidelines associated with different hot keys have different graphical appearances. In other embodiments, different sets of control guidelines associated with different hot keys have the same graphical appearance.

The set of control guidelines help the user specify, through use of a cursor controlling device, the manner of the selected transform to be applied to the item (i.e., an aspect of the selected transform and the extent of the aspect to be applied to the item). In some embodiments, a particular aspect of a selected transform is specified by a particular movement of a cursor (controlled by the cursor controlling device) in the GUI where the extent of the particular aspect is specified by the distance of the movement of the cursor. In some embodiments, each guideline in the set of control guidelines corresponds to a particular aspect of a selected transform. In some embodiments, each guideline in the set of control guidelines visually/graphically indicates a particular movement of the cursor needed to specify/select the particular aspect that corresponds to the guideline. In some embodiments, each guideline in the set of control guidelines has a different appearance (e.g., in terms of color, line pattern, etc.) and/or orientation.

Figure 6:
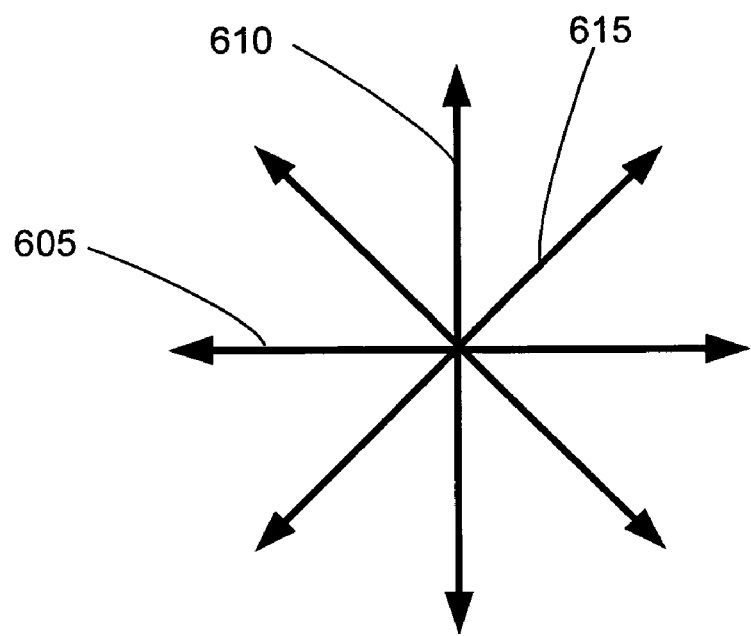
FIG. 6 illustrates an example of a set of control guidelines used in some embodiments.

FIG. 6 illustrates an example of a set of control guidelines 600 used in some embodiments. The set of control guidelines 600 comprises a set of three guidelines each having a different appearance and orientation in relation to the other guidelines in the set. A first guideline 605 corresponds to an X-axis aspect, a second guideline 610 corresponds to a Y-axis aspect, and a third guideline 615 corresponds to a Z-axis aspect of a selected transform. As shown in FIG. 6, each guideline graphically indicates a particular direction of cursor movement needed to specify the particular aspect that corresponds to the guideline. As such, the first guideline 605 graphically indicates that a horizontal cursor movement is needed to specify the X-axis aspect, the second guideline 610 graphically indicates that a vertical cursor movement is needed to specify the Y-axis aspect, and the third guideline 615 graphically indicates that a diagonal cursor movement is needed to specify the Z-axis aspect of a selected transform.

In some embodiments, after receiving an initial movement of the cursor (of a predetermined distance) in accordance with a cursor movement indicated by a particular guideline, the other guidelines in the set of control guidelines are no longer displayed so that only the particular guideline is shown. For example, in FIG. 6, after an initial horizontal cursor movement is received in accordance with the cursor movement indicated by the first guideline 605 (thus indicating a selection of the X-axis aspect), the second and third guidelines 610 and 615 would no longer be displayed.

In further embodiments, an initial cursor movement in accordance with a cursor movement indicated by a particular guideline selects the aspect of the transform corresponding to the particular guideline wherein later movements of the cursor can not deselect the aspect. For example, in FIG. 6, after an initial horizontal cursor movement is received, the X-axis aspect of the transform is selected so that, even if the cursor later moves in vertical or diagonal directions, the X-axis aspect is not deselected.

Figure 7:
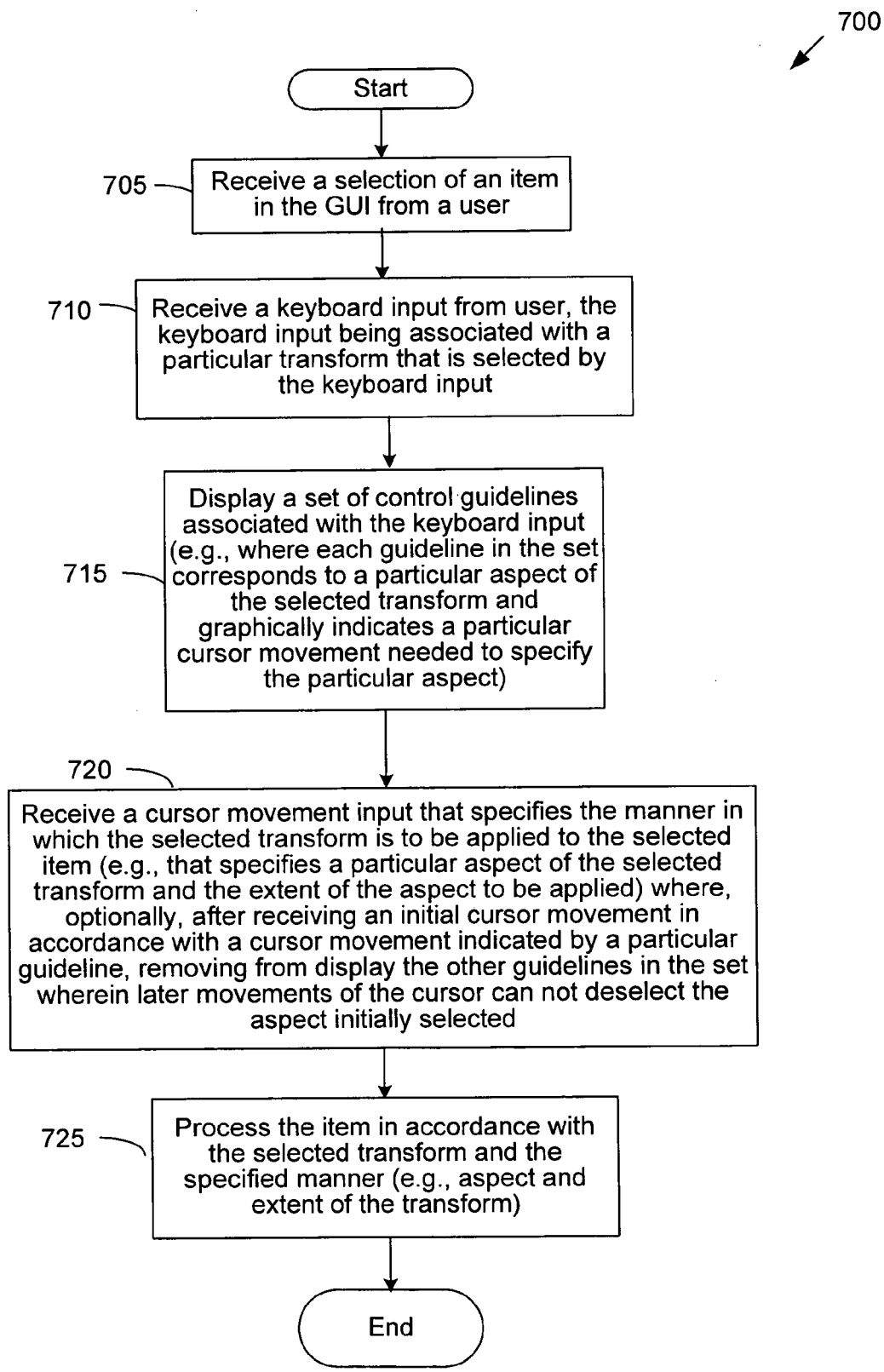
FIG. 7 is a flowchart of a method for processing an item presented in a graphical user interface (GUI) of a multimedia application.

FIG. 7 is a flowchart of a method 700 for processing an item presented in a graphical user interface (GUI) of a multimedia application. In some embodiments, the method is implemented by software or hardware configured to process multimedia items. The method 700 begins when it receives (at 705) a selection of an item in the GUI by a user, for example, through use of a keyboard or cursor controlling device. The method then receives (at 710) a keyboard input (hot key input) from the user, the keyboard input being associated with a particular transform/function, wherein receiving the keyboard input selects/specifies the associated transform to be applied to the selected item.

Upon receiving the keyboard input, the method then displays (at 715) a set of control guidelines associated with the keyboard input. In some embodiments, each guideline in the set of control guidelines corresponds to a particular aspect of the selected transform and graphically indicates a particular movement of a cursor needed to specify the particular aspect. As used herein, the cursor movements that specify aspects of the selected transform are referred to as a set of specifying cursor movements.

The method then receives (at 720) a cursor movement input (through the GUI from a cursor controlling device) having a direction and distance that specifies the manner in which the selected transform is to be applied to the selected item. In some embodiments, the cursor input comprises a particular cursor movement in the set of specifying cursor movements that specifies a particular aspect of the selected transform to be applied to the selected item. Optionally, after receiving an initial cursor movement (of a predetermined distance) in accordance with a cursor movement indicated by a particular guideline, the method removes from display the other guidelines in the set of control guidelines so that only the particular guideline is shown. As a further option, an initial cursor movement (of a predetermined distance) in accordance with a cursor movement indicated by a particular guideline selects the aspect of the transform corresponding to the particular guideline wherein later movements of the cursor can not deselect the aspect. The distance of the cursor movement input in the GUI received at step 720 specifies the extent of the aspect of the selected transform to be applied to the selected item.

The method then processes (at 725) the item in accordance with the selected transform and the specified manner (aspect and extent) of which the selected transform is to be applied to the selected item. The method 700 then ends.

Figure 8A:
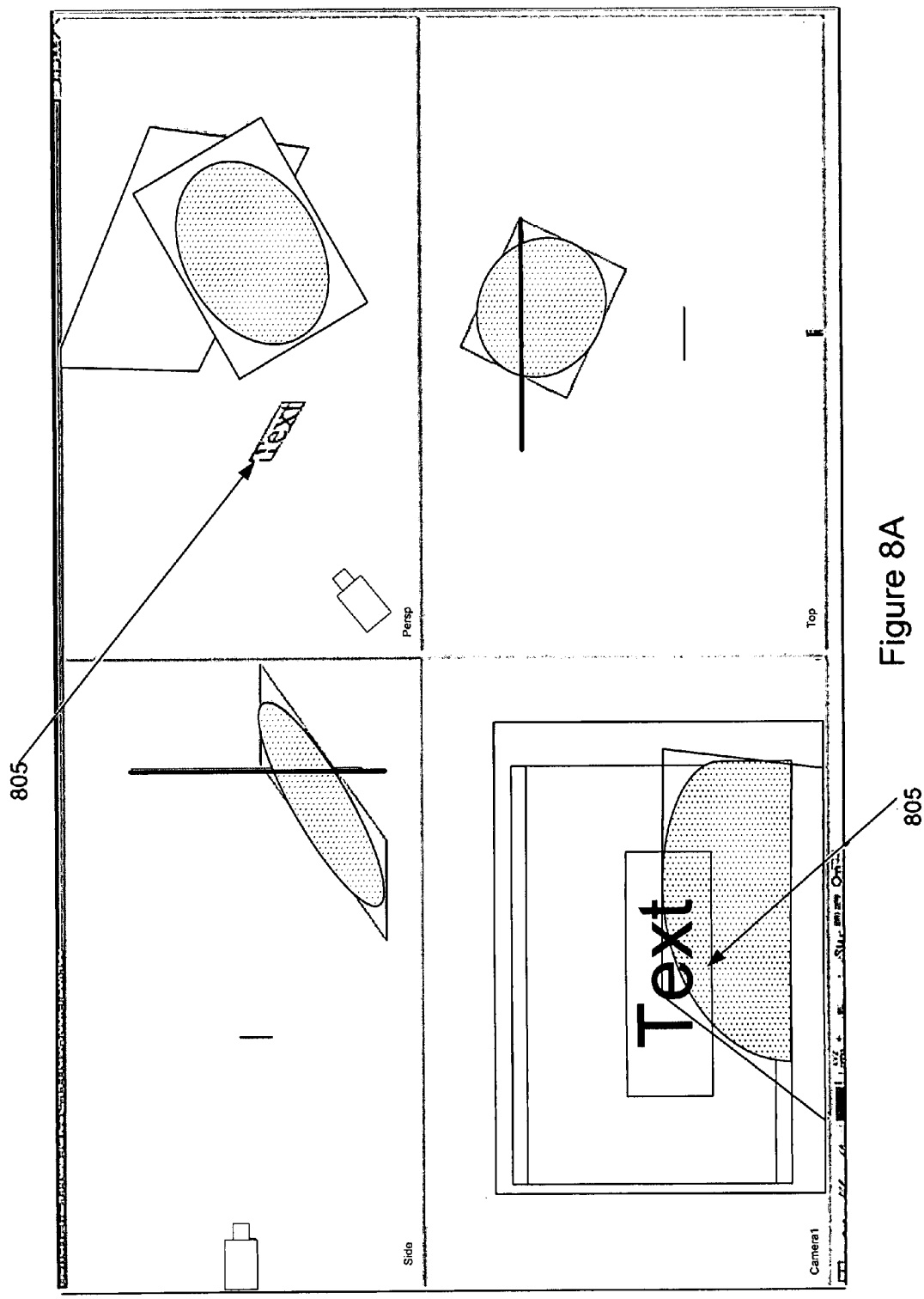
FIGS. 8A-D are screenshots of a GUI of a multimedia application that illustrate a scale transform example of the method of FIG. 7.
Figure 8B:
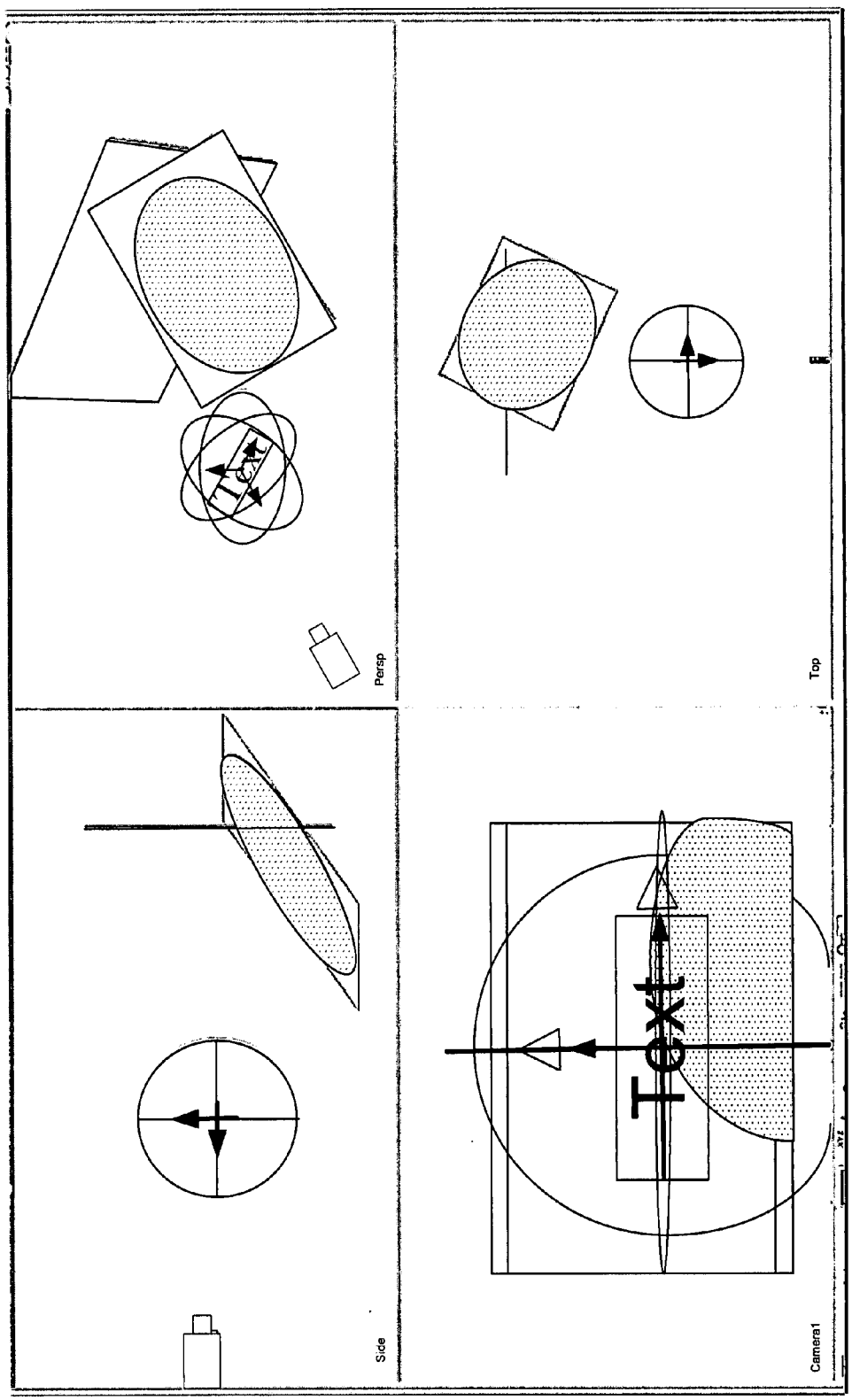
Figure 8C:
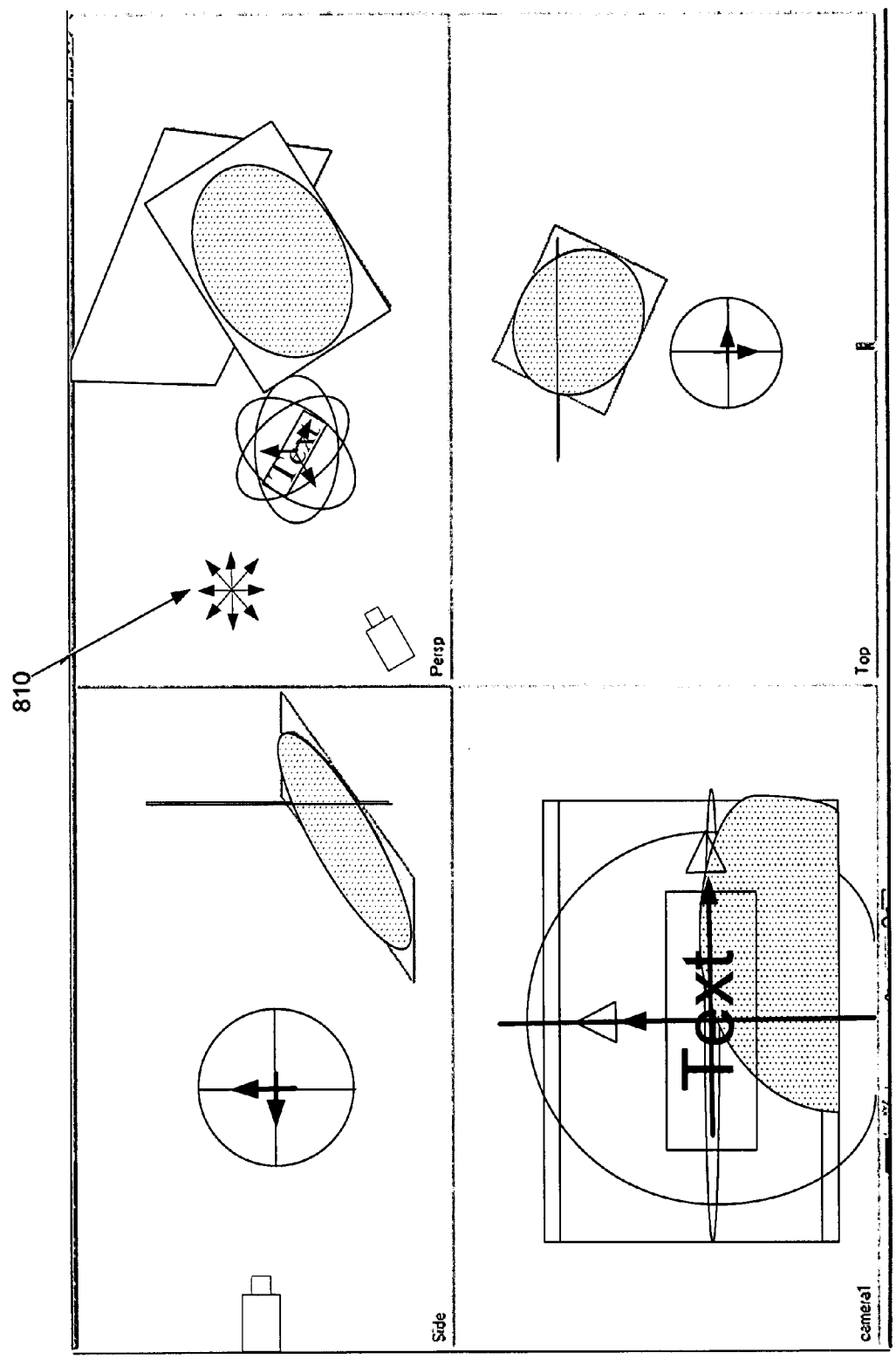
Figure 8D:
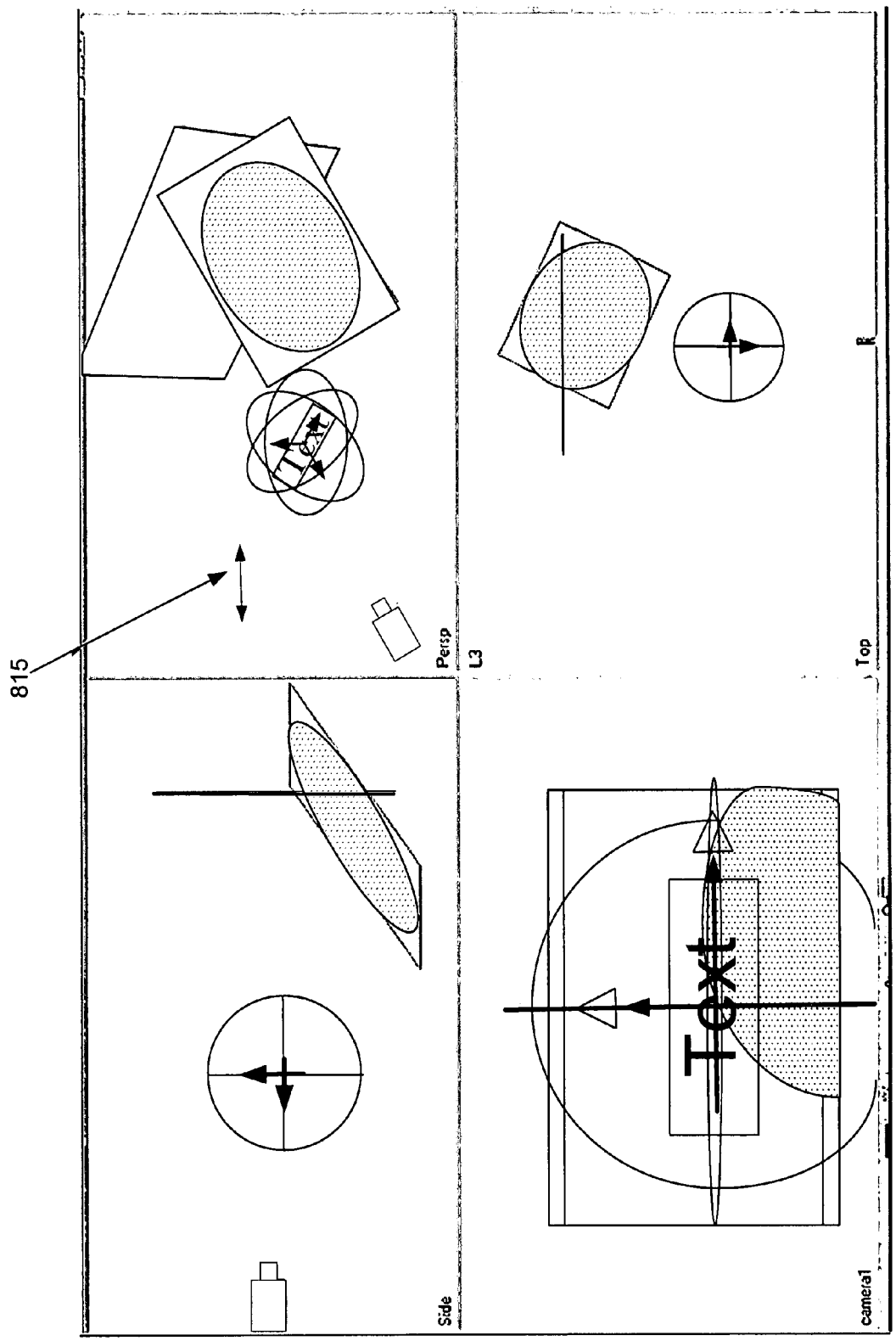

FIGS. 8A-D and 9A-B are screenshots of a GUI of a multimedia application that illustrate steps of the method 700. These figures are described in relation to an upper right pane showing a perspective view of a 3D workspace. FIGS. 8A-D are screenshots of a GUI of a multimedia application that illustrate a scale transform example of the method 700. FIG. 8A shows a screenshot of the GUI displaying a plurality of items including a text plane 805 (labeled "Text"). FIG. 8B shows the text plane 805 after it has been selected (as indicated by the appearance of global and local pan controls superimposed on the plane). FIG. 8C shows the GUI after a scaling hot key input corresponding to the scaling transform has been received and a set of control guidelines 810 (the set of horizontal, vertical, and diagonal arrowed lines to the upper left of the text plane) associated with the scaling hot key has been displayed. And FIG. 8D shows the GUI after the X-axis aspect of the scale transform has been specified by a cursor movement, and therefore, only the guideline 815 (the horizontal arrowed line) corresponding to the X-axis aspect remains displayed in the GUI while the other guidelines have been removed.

Figure 9A:
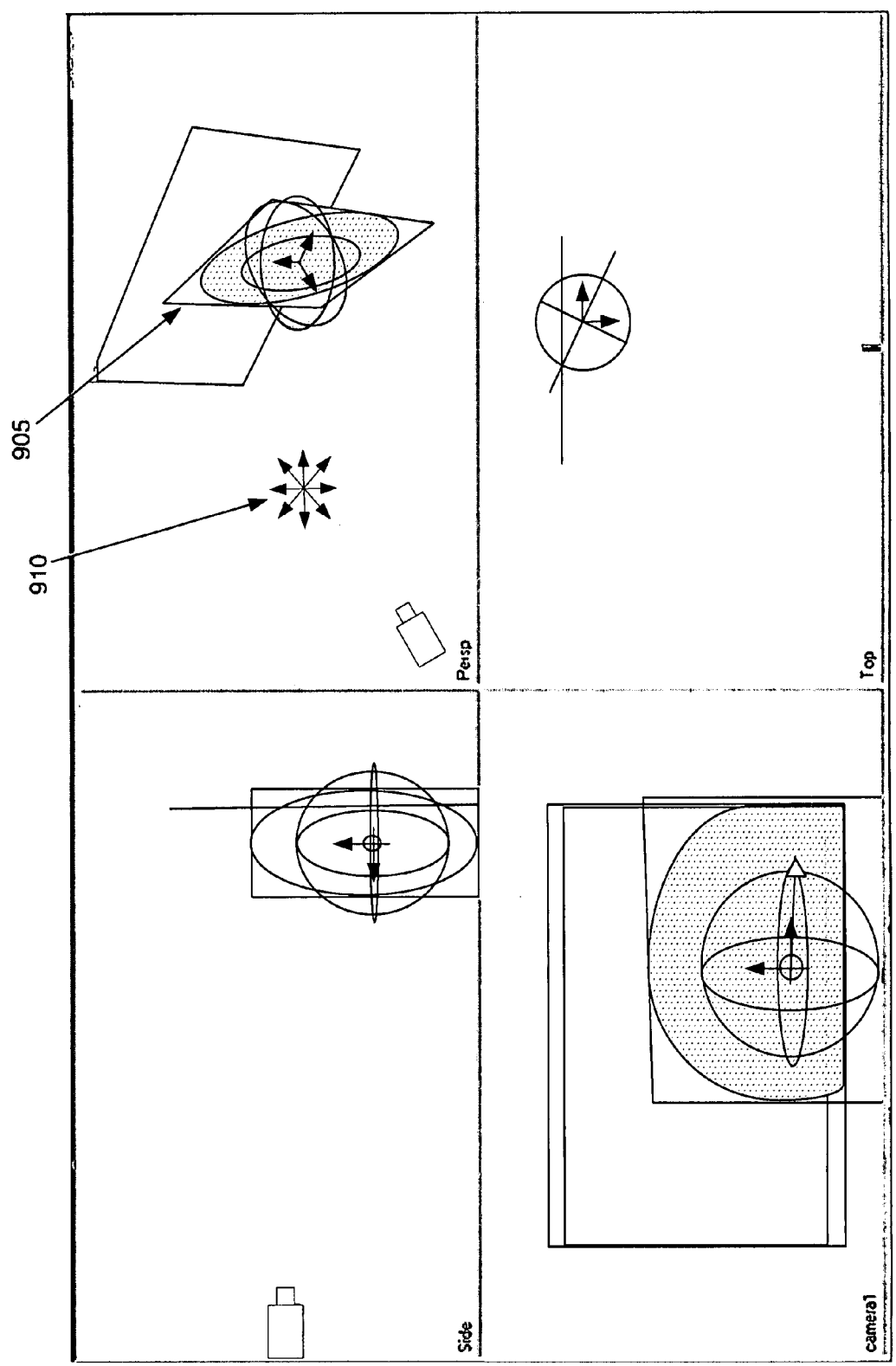
FIGS. 9A-B are screenshots of a GUI of a multimedia application that illustrate a rotate transform example of the method of FIG. 7.
Figure 9B:
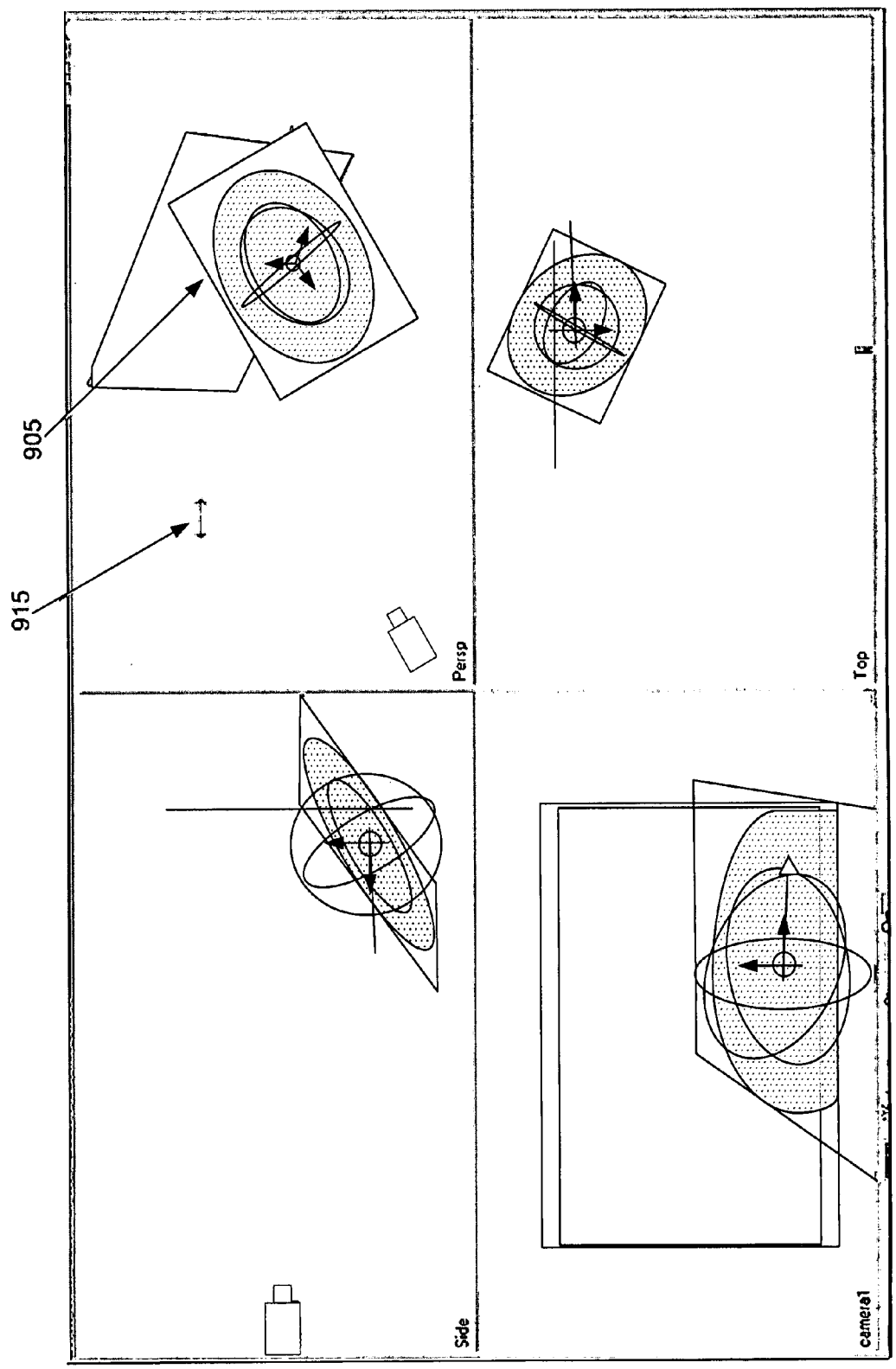

FIGS. 9A-B are screenshots of a GUI of a multimedia application that illustrate a rotate transform example of the method 700. FIG. 9A shows a screenshot of the GUI displaying a plurality of items including a plane 905 with a circle. As shown in FIG. 9A, the circle plane 905 has been selected (as indicated by the appearance of global and local pan controls superimposed on the plane) and the rotate hot key input corresponding to the rotate transform has been received (as indicated by the set of horizontal, vertical, and diagonal control guidelines 910 displayed to the left of the plane). FIG. 9B shows the GUI after the X-axis aspect of the rotate transform has been specified by a cursor movement, and therefore, only the guideline 915 (the horizontal arrowed line) corresponding to the X-axis aspect remains displayed in the GUI while the other guidelines have been removed. FIG. 9B also shows that the circle plane 905 has thus been rotated along the X-axis.

III. Multi-Plane Depth Ordering

In a compositing application (such as Shake) that composites and renders two or more planes in a 3D workspace, determinations must be made as to the Z-depth ordering of the planes (e.g., according to the distance Z from a virtual camera) to determine if and how the planes occlude/obscure each other. The Z-depth ordering of planes determine which planes are considered to be in front or behind others. As such, in compositing or rendering two or more planes, a first plane determined to be in front of a second plane may, in some circumstances, occlude all or a portion of the second plane. Thus, the Z-depth ordering of planes can affect the final composited or rendered output.

Figure 10:
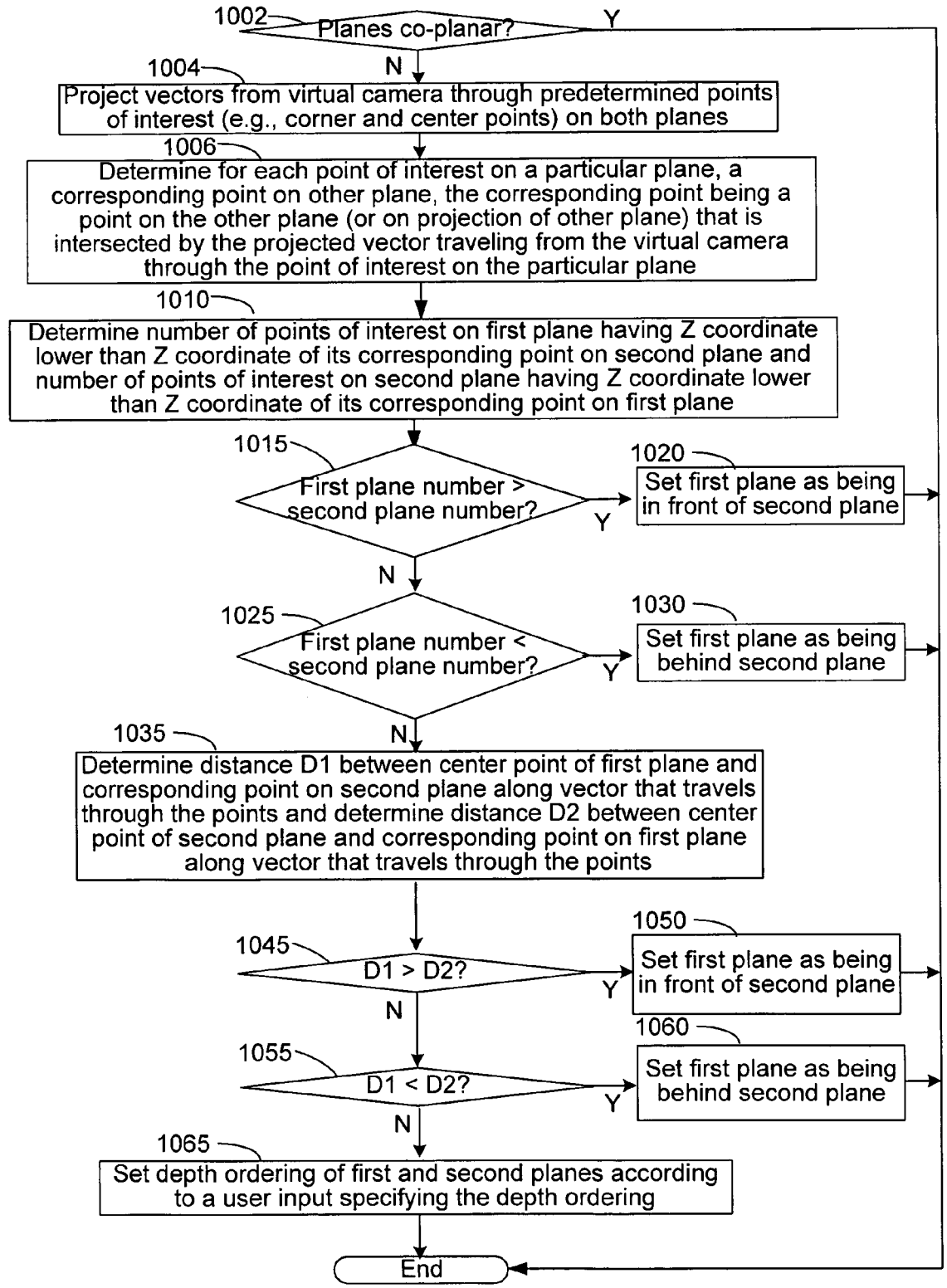
FIG. 10 is a flowchart of a method for determining a Z-depth ordering between first and second planes in a 3D workspace.

FIG. 10 is a flowchart of a method 1000 for determining a Z-depth ordering between first and second planes in a 3D workspace in relation to a reference position in the workspace. In the embodiments described below, the reference position is a virtual camera placed in the workspace. In some embodiments, the reference position is something other than a virtual camera. FIG. 10 is described in relation to FIGS. 11A-B that conceptually illustrate examples of the steps of the method 1000. In some embodiments, the method is implemented by software or hardware configured to process multimedia items.

The method 1000 begins by determining (at 1002) if the first and second planes are coplanar (i.e., of the same plane) using conventional methods known in the art. If so, the method proceeds to step 1065 where the method sets the Z-depth ordering of the planes according to a user input specifying the depth ordering. If not, the method projects (at 1004) vectors from the virtual camera through predetermined points of interest on the first and second planes. In some embodiments, these points of interest comprise corner and center points of the planes. The method then determines (at 1006), for each point of interest on a particular plane, a corresponding point on the other plane, the corresponding point being a point on the other plane (or a point on a projection of the other plane) that is intersected by the projected vector traveling from the virtual camera through the point of interest on the particular plane.

Figure 11A:
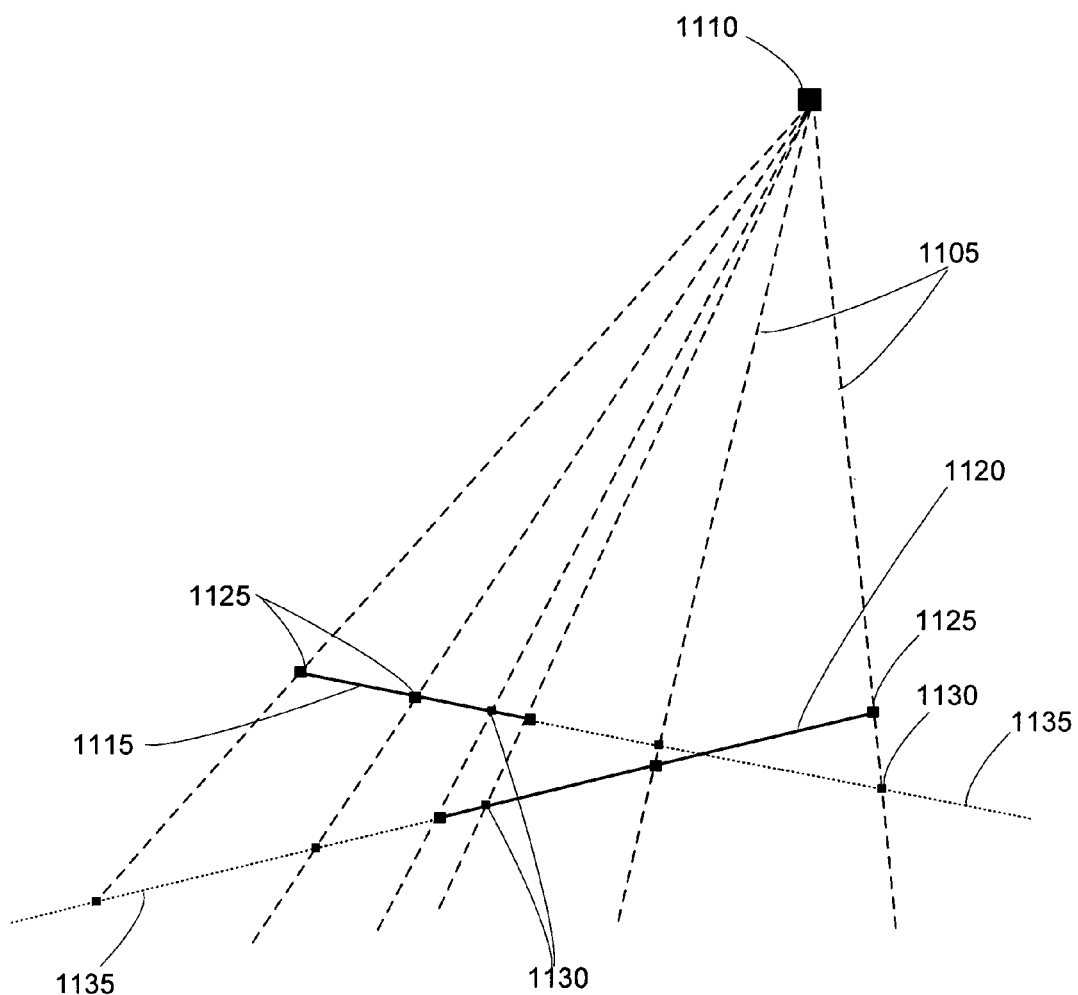
FIGS. 11A-B that conceptually illustrate examples of the steps of the method of FIG. 10.

Steps 1004 and 1006 are illustrated in FIG. 11A which is a 2D simplification of the 3D Z-depth ordering method 1000. As shown in FIG. 11A, vectors 1105 are projected from a virtual camera 1110 through each point of interest 1125 on a first plane 1115 and a second plane 1120. In the 2D simplification of FIG. 11A, only three points of interest (corner and center points) are shown for each plane. As shown in FIG. 11A, a vector travels through a point of interest 1125 on a particular plane and intersects a corresponding point 1130 on the other plane, the corresponding point 1130 being a point on the other plane or a point on a projection 1135 of the other plane.

The method then determines (at 1010) the number of points of interest on the first plane that have a Z coordinate that is lower than the Z coordinate of its corresponding point on the second plane (this number being referred to as the first plane number) and determines the number of points of interest on the second plane that have a Z coordinate that is lower than the Z coordinate of its corresponding point on the first plane (this number being referred to as the second plane number). In the example shown in FIG. 11A, the first plane 1115 has three points of interest that have lower Z coordinates (i.e., are closer to the virtual camera) than the corresponding points on the second plane 1120. The second plane 1120 is shown to have one point of interest that has a lower Z coordinates than its corresponding point on the first plane 1115. As such, the Z-depth ordering of the planes is set to indicate that the first plane 1115 is in front of the second plane 1120, as discussed below.

The method then determines (at 1015) whether the first plane number is greater than the second plane number. If so, the method sets (at 1020) the Z-depth ordering of the planes to indicate that the first plane is in front of the second plane and the method 1000 ends. If not, the method determines (at 1025) whether the first plane number is less than the second plane number. If so, the method sets (at 1030) the Z-depth ordering of the planes to indicate that the first plane is behind the second plane and the method 1000 ends. If not, this indicates that the first and second plane numbers are equal and the method proceeds to step 1035.

At step 1035, the method determines the distance between the center point of the first plane and its corresponding point on the second plane along the vector that travels through these points (this distance being referred to as the first plane distance D1) and determines the distance between the center point of the second plane and its corresponding point on the first plane along the vector that travels through these points (this distance being referred to as the second plane distance D2).

Figure 11B:
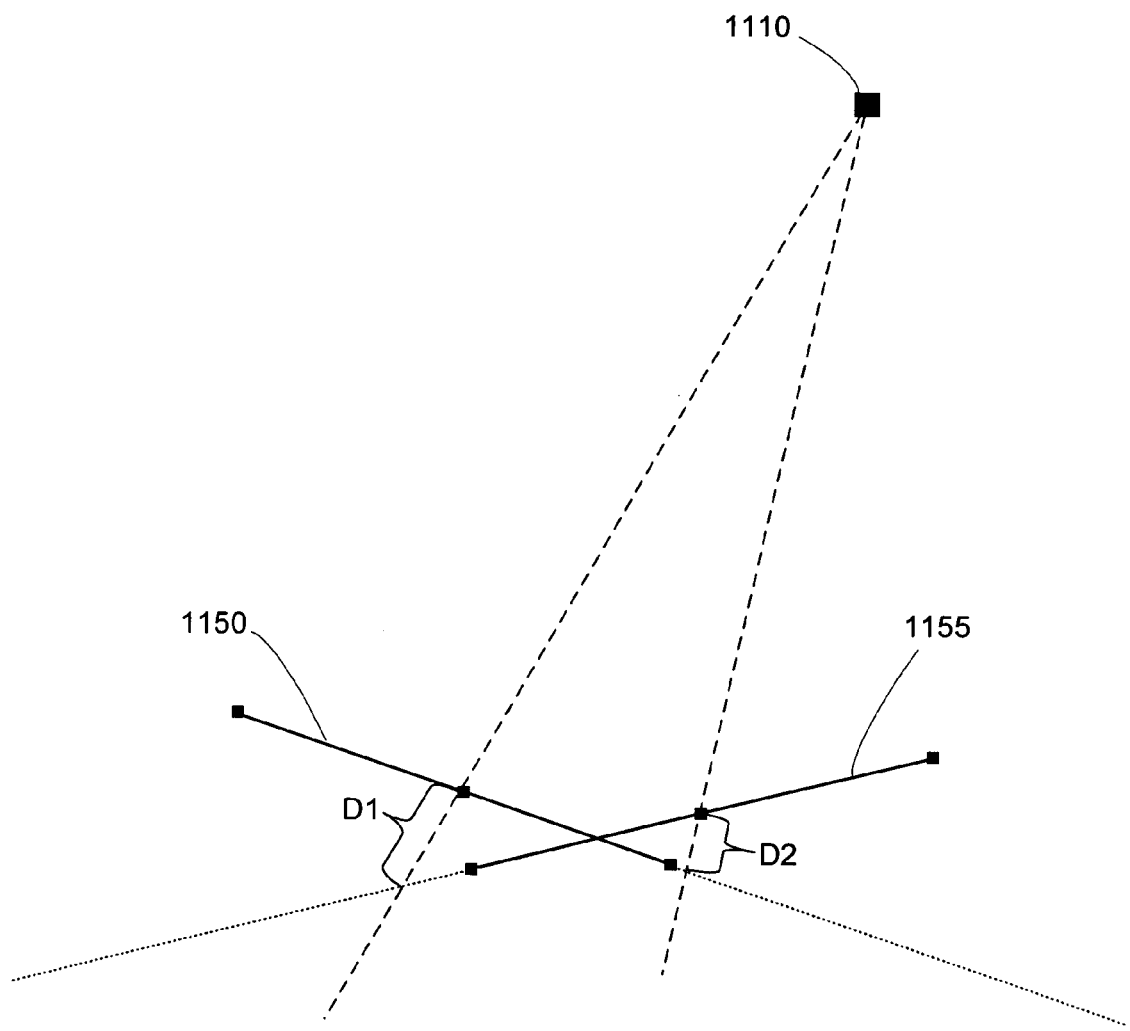

Steps 1035 and 1040 are illustrated in FIG. 11B which is a 2D simplification of the 3D Z-depth ordering method 1000. As shown in FIG. 11B, a first plane 1150 has a first plane number equal to 2 and a second plane 1155 has a second plane number also equal to 2. As such, the distance D1 between the center point of the first plane and its corresponding point on the second plane along the vector that travels through these points is determined. Also, the distance D2 between the center point of the second plane and its corresponding point on the first plane along the vector that travels through these points is determined.

The method then determines (at 1045) whether the first plane distance D1 is greater than the second plane distance D2. If so, the method sets (at 1050) the Z-depth ordering of the planes to indicate that the first plane is in front of the second plane and the method 1000 ends. If not, the method then determines (at 1055) whether the first plane distance D1 is less than the second plane distance D2. If so, the method sets (at 1060) the Z-depth ordering of the planes to indicate that the first plane is behind the second plane and the method 1000 ends. If not, this indicates that the first and second plane distances are equal and the method proceeds to step 1065.

At step 1065, the method sets the Z-depth ordering of the planes according to a user input specifying the depth ordering. For example, the user may specify the depth ordering of the planes through a plane ordering interface 340 (as shown in FIG. 3). The method 1000 then ends.

Note that even though the first and second planes may intersect, the method sets one plane to be entirely in front or behind the other. As such, in later compositing or rendering of the planes, the plane set to be in front will be shown with no portions of the plane being occluded by the plane set to be in the back, even though portions of the "back" plane may have Z coordinates that are lower than portions of the "front" plane.

Figure 12A:
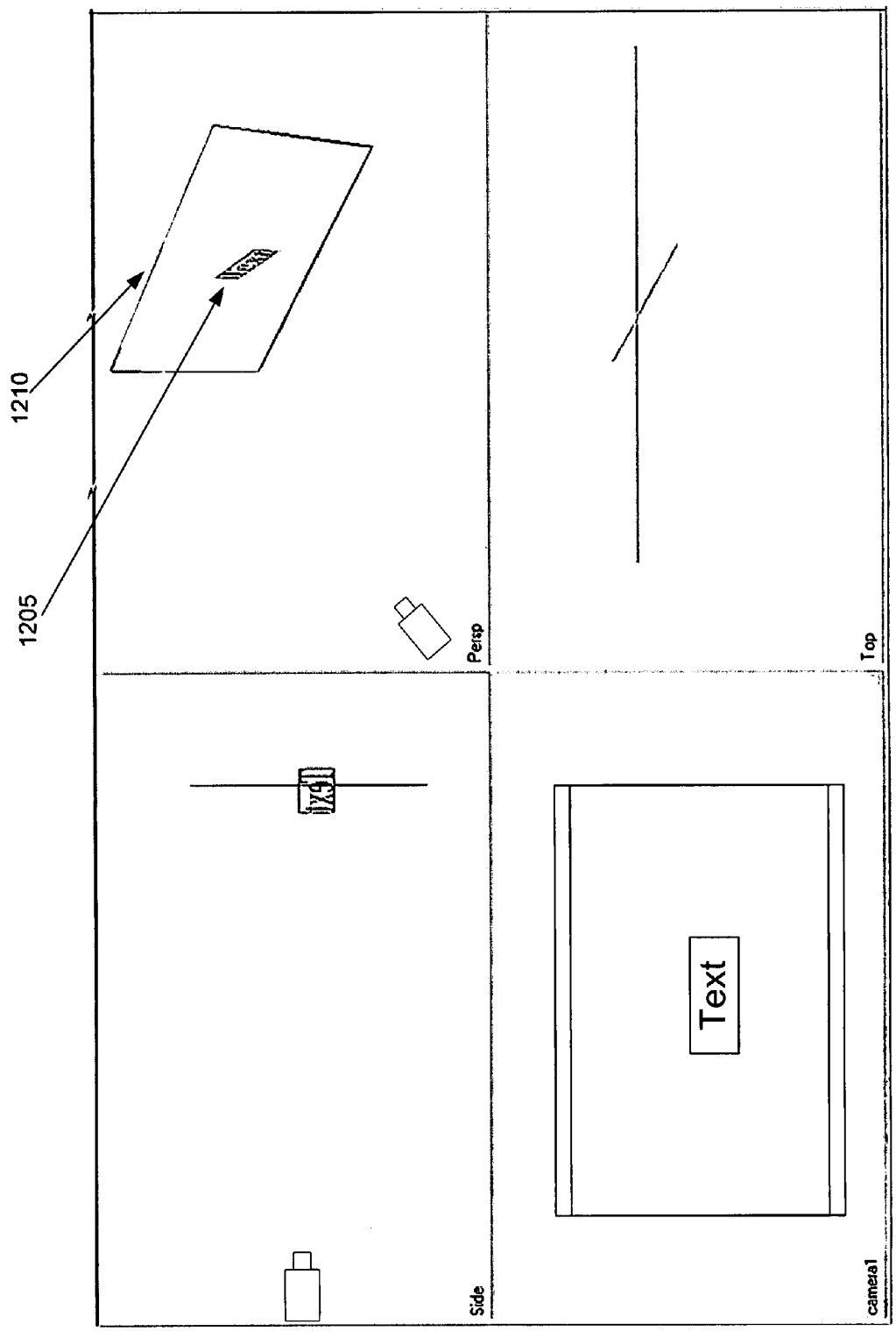
FIGS. 12A-B are screenshots of a display of a multimedia application that illustrate steps of the method of FIG. 10.
Figure 12B:
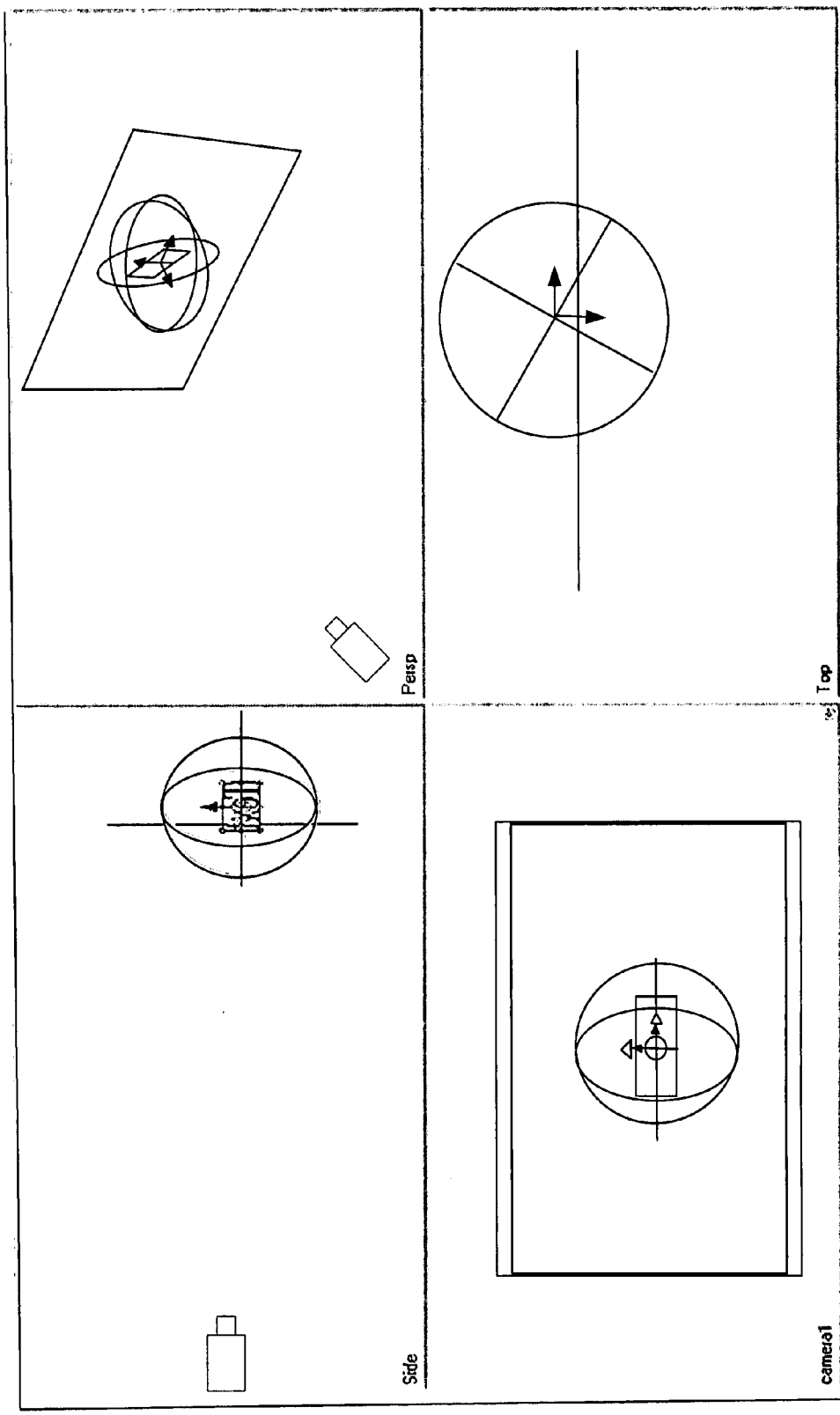

FIGS. 12A-B are screenshots of a display of a multimedia application that illustrate steps of the method 1000. FIG. 12A shows a screenshot of a first text plane 1205 (labeled "Text") that intersects a second non-text plane 1210 in a 3D workspace. The intersection of the planes can be seen in the side view (upper left pane) and top view (lower right pane) of the workspace. FIG. 12B shows the workspace after it has been determined that the first text plane 1205 is behind the second non-text plane 1210. Note that although the first and second planes intersect, the first text plane is specified (for compositing and rendering purposes) to be entirely behind the second non-text plane (as shown in the "Camera1" view of the lower left pane). As such, the second plane will be composited or rendered with no portions of the second plane being occluded by the first plane.

IV. Identification of Data Characteristics Through Interconnect Appearance

As discussed above in relation to FIG. 1, a process tree 100 comprises a set of nodes and a set of interconnects 110 between the nodes where leaf nodes 115 comprise multimedia items (e.g., text, image, video, audio, etc.) and non-leaf nodes 120 comprise functions/transforms performed on the multimedia items. An interconnect between two nodes represents the multimedia data (e.g., image data, video data, etc.) being passed between the two nodes. As such, the interconnects of the process tree indicate the flow of data between the nodes and indicates from which node(s) another node receives or sends data. In some embodiments, the graphical appearance of an interconnect between two nodes indicate particular characteristics of the multimedia data being passed (outputted and inputted) between the two nodes. As such, the appearance of interconnects between nodes indicates the characteristics of data being propagated down the process tree at a glance.

In some embodiments, the particular color and/or line patterning (stipple patterning) of an interconnect indicates particular data characteristics. In some embodiments, data characteristics indicated by the appearance of an interconnect include color bit depth (e.g., 8, 16, or 32 (floating point) bit, etc.) and/or channel configuration (i.e., the number and type of each channel being propagated). Examples of channel configurations include A, BW, BWA, RGB, RGBA, Z, AZ, BWZ, BWAZ, RGBZ, RGBAZ, etc. In other embodiments, other data characteristics are indicated by the appearance of an interconnect.

Figure 13:
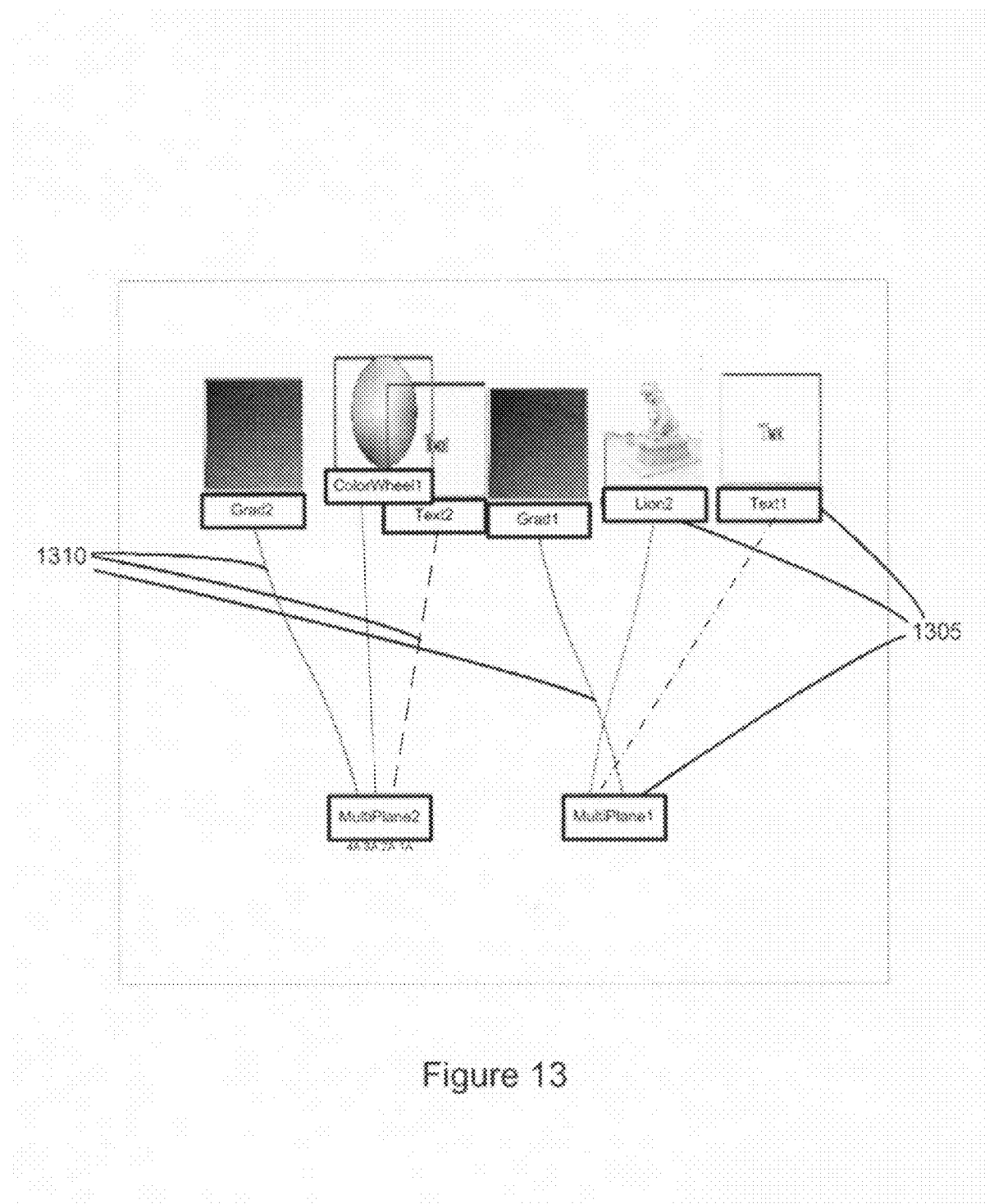
FIG. 13 shows an example of a portion of a process tree having a plurality of nodes connected by a plurality of interconnects having different appearances that indicate different data characteristics.

For example, an interconnect between a first and second node that is blue with a solid line pattern may indicate that image data being output by the first node and received by the second node is 8 bit, RGB image data (e.g., where the solid line pattern indicates that the data has 8 bit color depth and the blue color indicates that the data has an RGB channel configuration). As a further example, an interconnect between a third and fourth node that is red with a dotted line pattern may indicate that image data being output by the third node and received by the fourth node is 16 bit, RGBA image data (e.g., where the dotted line pattern indicates that the data has 16 bit color depth and the red color indicates that the data has an RGBA channel configuration). FIG. 13 shows an example of a portion of a process tree having a plurality of nodes 1305 connected by a plurality of interconnects 1310 having different appearances in color and/or stippling patterns to indicate different characteristics of data passed between the nodes 1305.

Figure 14:
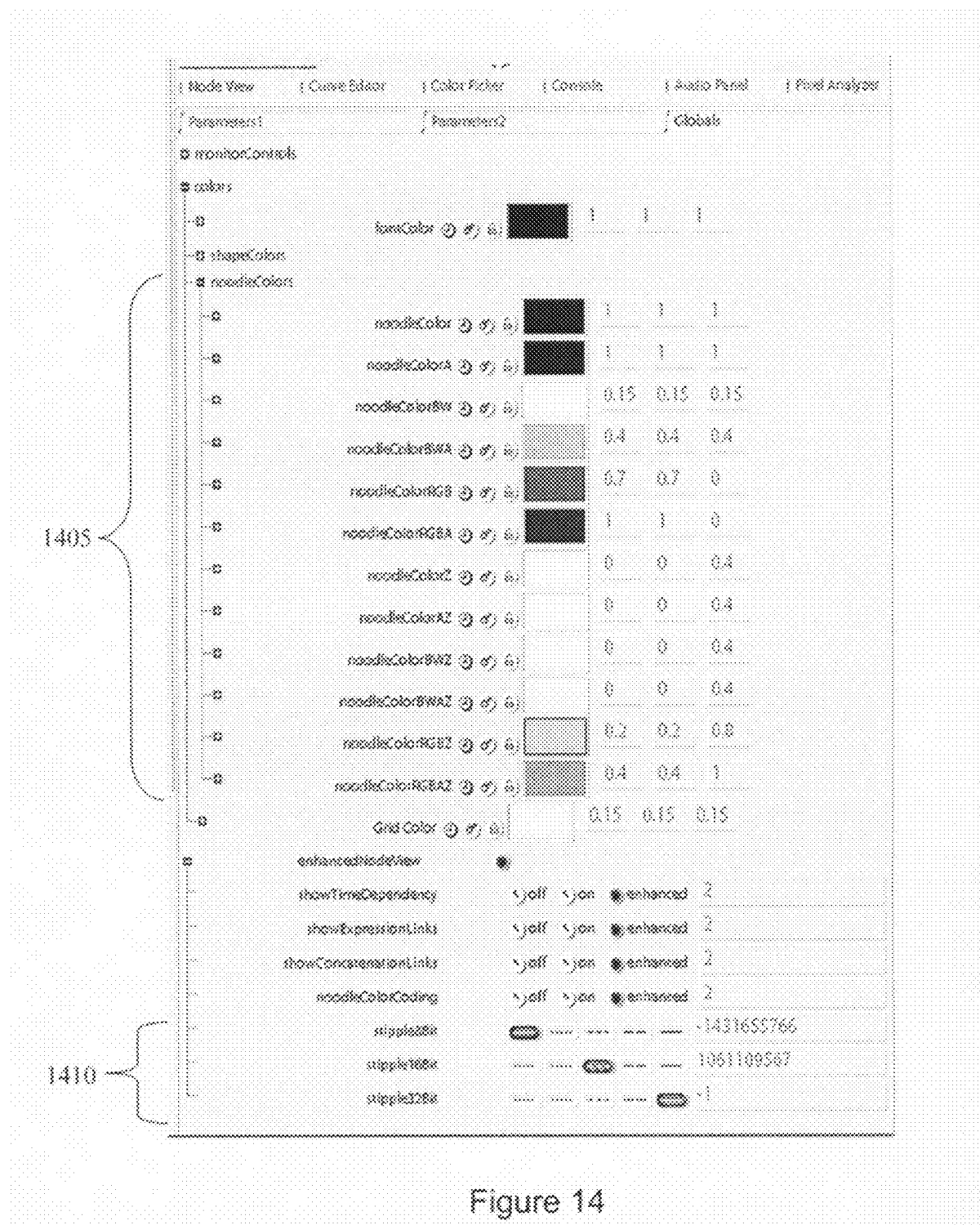
FIG. 14 shows a screenshot of an interface of a multimedia application having interfaces for customizing the appearance of interconnects.

In some embodiments, the appearance of an interconnect and the data characteristics that the appearance indicate are user configurable. FIG. 14 shows a screenshot of an interface of a multimedia application having a first interface section 1405 and a second interface section 1410. The first interface section 1405 allows a user to specify particular interconnection colors for indicating particular channel configurations. The second interface section 1410 allows a user to specify among five different interconnection stippling patterns for indicating particular bit depths. (Note that an interconnection is referred to as a "noodle" in FIG. 14.)

Figure 15:
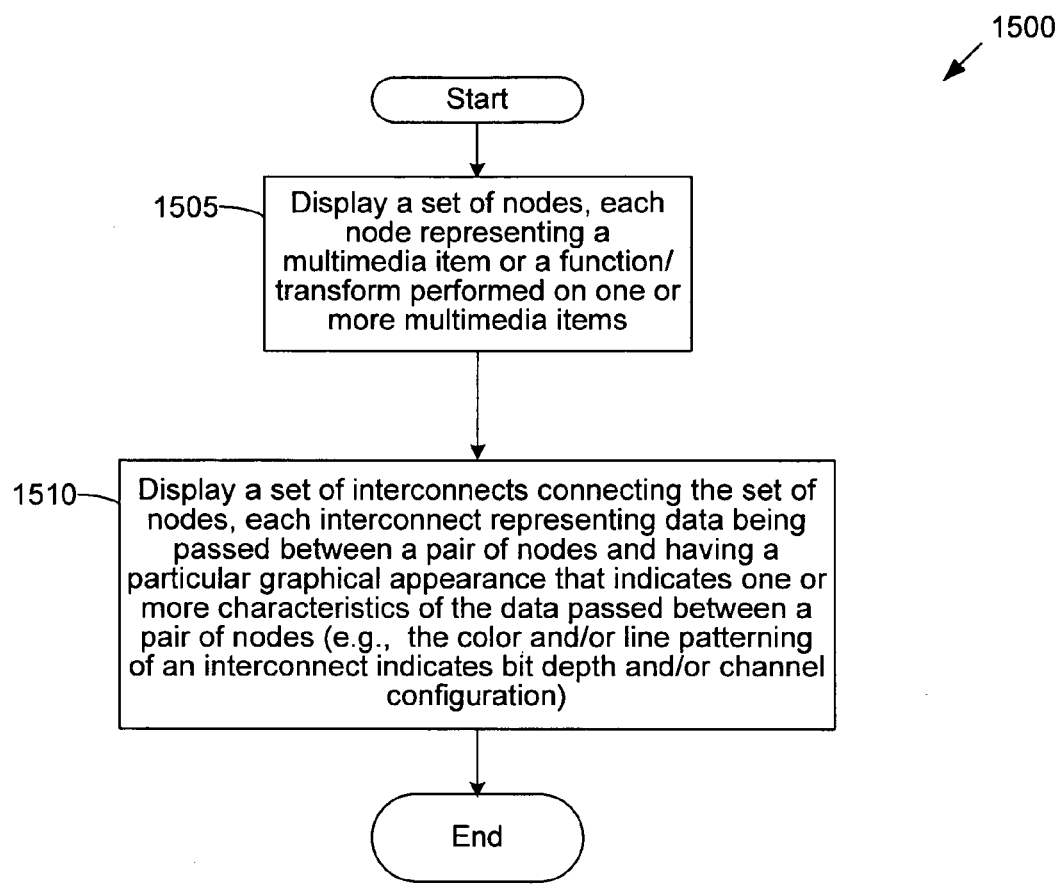
FIG. 15 is a flowchart of a method for displaying interconnects that connect nodes of a process tree.

FIG. 15 is a flowchart of a method 1500 for displaying interconnects that connect nodes of a process tree displayed in a multimedia application. In some embodiments, the method is implemented by software or hardware configured to process multimedia items. The method 1500 displays (at 1505) a set of nodes of the tree, each node representing a multimedia item (e.g., text, image, video, audio, etc.) or a function/transform performed on one or more multimedia items. The method 1500 then displays (at 1510) a set of interconnects connecting the set of nodes. Each displayed interconnect connects a pair of nodes and represents data being passed between the pair of nodes. One or more of the interconnects are displayed to have a particular graphical appearance that indicates one or more characteristics of the data passed between the pair of nodes that an interconnect connects. In some embodiments, the color and/or line patterning of an interconnect is used to indicate the one or more data characteristics. In some embodiments, the data characteristics of bit depth and/or channel configuration are indicated by the appearance of an interconnect. In some embodiments, the appearance of an interconnect and the data characteristics that the appearance indicate are specified by a user. The method 1500 then ends.

V. Transformation of Screen Space Cursor Movements

A user typically interacts with a multimedia application through a GUI display using a cursor controlling device. The cursor controlling device is used to move a cursor shown in the GUI display (screen space) to select and manipulate multimedia items in the workspace. The workspace has a global coordinate system (having a set of global coordinate axes) while each item in the workspace has a local coordinate system (having a set of local coordinate axes). The GUI display has a separate screen space coordinate system (having a set of screen space coordinate axes) that may or may not be aligned with the global or local coordinate systems.

In presenting multimedia items in the screen space, the dimensions of multimedia items in the workspace are transformed to present a particular view in the screen space. In transforming multimedia items in the screen space to a view in the screen space, the dimensions of the multimedia item may become "distorted" in that they do not represent the actual size of the multimedia item in the workspace.

As discussed above, distortion of the dimensions of a multimedia item can occur when transforming an item in the workspace to a perspective view on the screen space (as the perspective view provides a 3D simulation effect to approximate 3D visual perception). To display multimedia items/planes in perspective view, the items are transformed by a perspective view matrix that "distorts" dimensions of the items to achieve the 3D simulation effect provided in perspective view. Perspective view transforms for doing such are typically made according to an established geometric protocol and are well known in the art (and thus are not discussed in detail here).

Distortions of the dimensions of a multimedia item can also occur when transforming the item in the workspace to a non-perspective view on the screen space (e.g., front, side, top views). For example, in presenting a side view of an item that is rotated away from the display plane of a screen space (e.g., the plane of a monitor screen that displays the screen space), the length of the item (extending into the monitor) will appear shorter than it actually is in the workspace.

As such, in some situations, there is not a one-to-one relationship between the dimensions of an item in the workspace and the dimensions of the item as presented in the screen space. For example, a plane having a length of 50 units in the workspace may be presented in a view of the screen space as 35 units (e.g., if the plane is transformed into perspective view or rotated away from the screen space). As used herein, an item in the screen space not having a one-to-one relationship with its dimensions in the workspace are referred to as distorted items.

In transforming an item from the workspace to the screen space, a particular transform matrix is applied (e.g., front, side, perspective, etc.), the transform creating a distorted or non-distorted item in the screen space. To transform the item in the reverse direction (from the screen space to the workspace) an inverse transform matrix is typically applied to the item. Transforms in the reverse direction are needed, for example, when a cursor movement across the screen space is received and the cursor movement in the screen space needs to be transformed to a cursor movement in the workspace. When the screen space is presenting a non-perspective view, application of the appropriate inverse transform matrix is typically used to transform the cursor movement into the workspace.

When the screen space is presenting a perspective view in the screen space, however, transforming the cursor movement into the workspace is problematic. This is because, after being transformed by a perspective view matrix, an item is typically not able to be transformed back by applying an inverse-perspective view matrix transform to the item. As such, an inverse-perspective view matrix can not simply be applied to the cursor movement in the screen space to transform it into the workspace.

Figure 16:
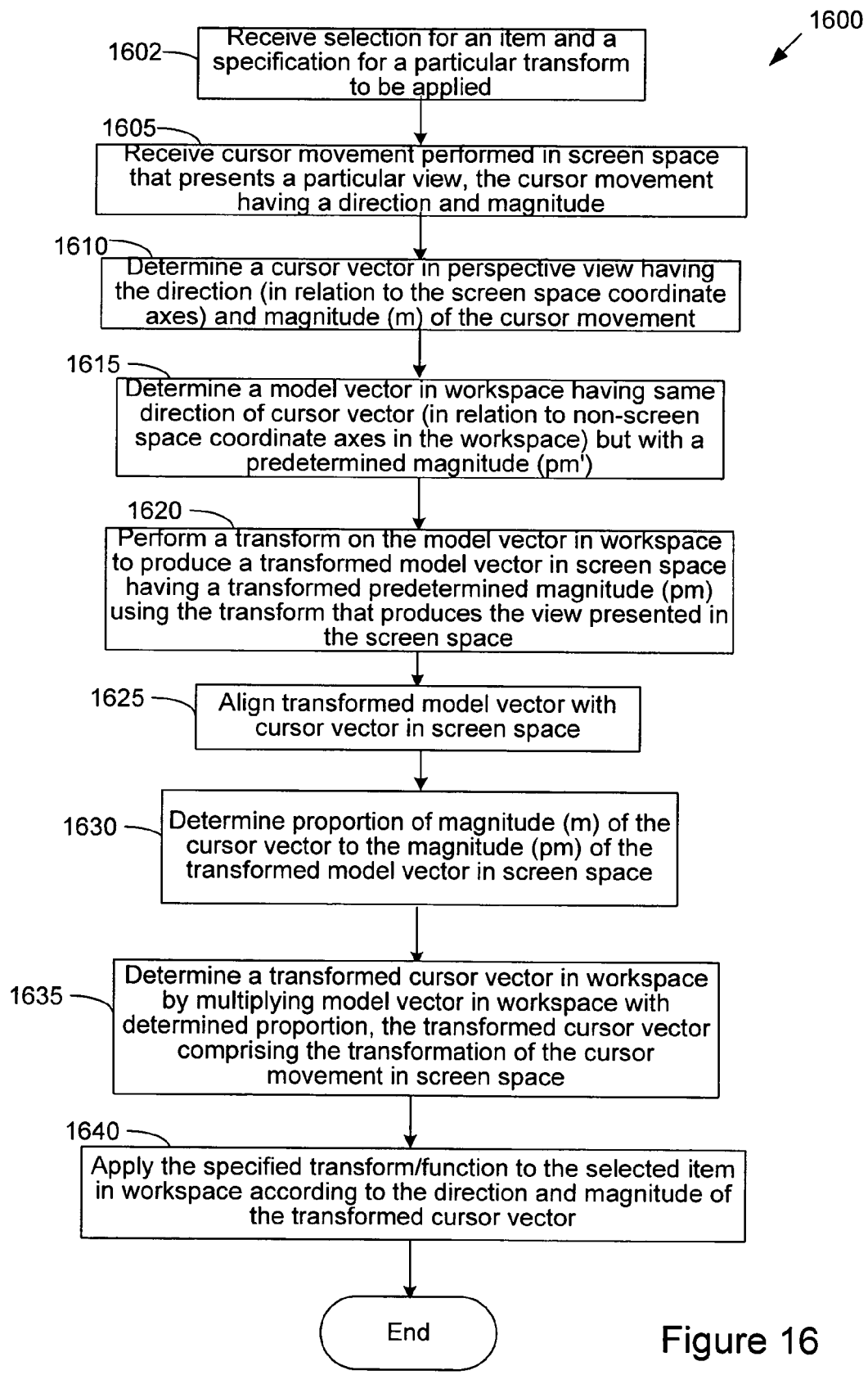
FIG. 16 is a flowchart of a method for transforming a cursor movement in a screen space coordinate system to a cursor movement in a non-screen space coordinate system in a workspace of a multimedia application.

FIG. 16 is a flowchart of a method 1600 for transforming a cursor movement in a screen space coordinate system to a cursor movement in a non-screen space coordinate system (e.g., global or local coordinate systems) in a workspace of a multimedia application. In some embodiments, the screen space is presenting a perspective view of the workspace (whereby a PV transform matrix is applied to items in the workspace to produce the perspective view). In other embodiments, the screen space is presenting a non-perspective view of the workspace (whereby a non-PV transform matrix is applied to items in the workspace to produce the non-perspective view). In some embodiments, the method is implemented by software or hardware configured to process multimedia items.

FIG. 16 is described in relation to FIGS. 17A-D that conceptually illustrate examples of the steps of the method 1600. In the description below and related Figures, magnitudes in the screen space are represented by symbols (e.g., m) whereas magnitudes in the workspace are represented by symbols having apostrophes (e.g., m'). In some embodiments, the various vectors determined below are conceptual vectors used for transform purposes and are not actually displayed.

The method 1600 begins when it receives (at 1602) a selection for an item in the screen space and a specification for a particular transform to be applied to the item. In some embodiments, a global or local pan/move transform is specified. A global pan/move transform requires transform of the cursor movement to the global coordinate system of the workspace, whereas a local pan/move transform requires transform of the cursor movement to the local coordinate system of the selected item. As shown below, specification of a global pan/move transform as opposed to a local pan/move transform can produce different cursor transform results in some circumstances, as discussed below. To apply a transform (e.g., move/pan, rotate, etc.) to an item, a cursor movement can be used to specify a particular aspect of the transform (as specified by the direction of the cursor movement) and the extent/degree (as specified by the magnitude of the cursor movement) of the particular aspect to be applied to the selected item.

The method 1600 then receives (at 1605) a cursor movement performed in the screen space, the cursor movement having a particular direction (in relation to the screen space coordinate axes) and magnitude (typically measured in pixels). In some embodiments, the direction of the cursor movement is along a particular axis of the screen space. For example, a received cursor movement can be in the horizontal direction along the X-axis of the screen space coordinate system. In other embodiments, the direction of the cursor/item movement is not along a particular axis of the screen space.

Figure 17A:
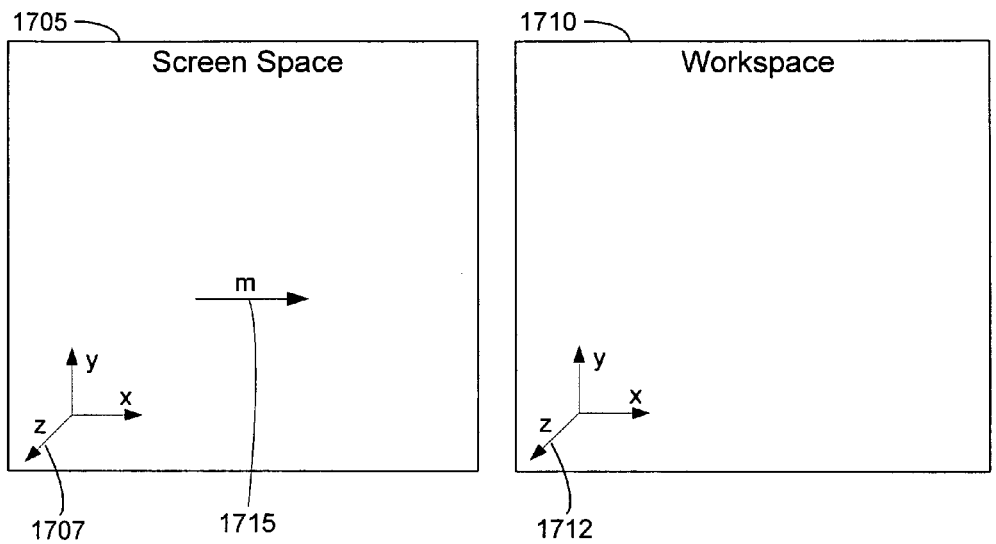
FIGS. 17A-D illustrate examples of the steps of the method of FIG. 16.

The method then determines (at 1610) a cursor vector in the screen space having the direction (in relation to its screen space coordinate axes) and magnitude (m) of the cursor movement. This step is illustrated in FIG. 17A that shows a screen space 1705 (with screen space coordinate axes 1707) and a workspace 1710 (with workspace coordinate axes 1712) having a plurality of items (not shown). After a cursor movement has been received in the screen space 1705, a cursor vector 1715 in the screen space 1705 is determined having a horizontal direction along the X-axis of the screen space coordinate axes and a magnitude of m.

The method then determines (at 1615) a model vector in the workspace having the same direction of the cursor vector in the screen space (in relation to a non-screen space coordinate system in the workspace) but with a predetermined and known magnitude (pm'). In some embodiments, the predetermined magnitude is a predetermined number of pixels (e.g., 100, 500, etc.).

Figure 17B:
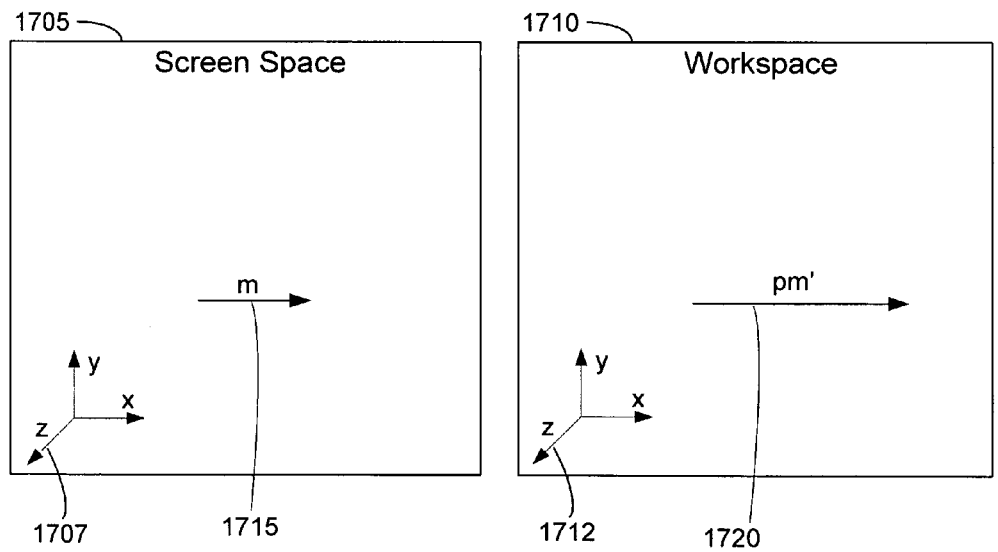

If the cursor movement is being transformed to a global coordinate system of the workspace (e.g., where a global pan/move transform is specified for the selected item) and the global coordinate axes are aligned with the screen space coordinate axes 1707, the direction of the model vector is also in the same direction relative to the cursor vector in the screen space. This situation is illustrated in FIG. 17B which shows a model vector 1720 in the workspace 1710 having the same direction as the cursor vector 1715 relative to the global coordinate axes (i.e., both vectors move along the X-axis of their respective coordinate axes) and to the cursor vector 1715 in the screen space 1705 (since the respective coordinate axes are aligned). FIG. 17B also shows that the model vector 1720 has a predetermined magnitude (pm').

However, if the cursor movement is being transformed to a local coordinate system of the selected item (e.g., where a local pan/move transform is specified for the selected item), the direction of the model vector may or may not be in the same direction relative to the cursor vector in the screen space since the local coordinate axes of the item may not be aligned with the screen space coordinate axes. For example, if the local coordinate axes are rotated by r degrees relative to the screen space coordinate axes, the direction of the model vector also varies by r degrees relative to the cursor vector.

The method then performs a transform (at 1620) on the model vector in the workspace to produce a transformed model vector in the screen space having a transformed predetermined magnitude (pm). The method 1600 does so using the transform matrix that produces the view presented in the screen space. In some embodiments, the transform is a perspective view transform that provides a 3D simulation effect. In these embodiments, the transformed magnitude (pm) is typically not equal to the original magnitude (pm') since the perspective view transform may distort dimensions of items that are transformed. In other embodiments, the transform is a non-perspective view transform that does not provide a 3D simulation effect.

Figure 17C:
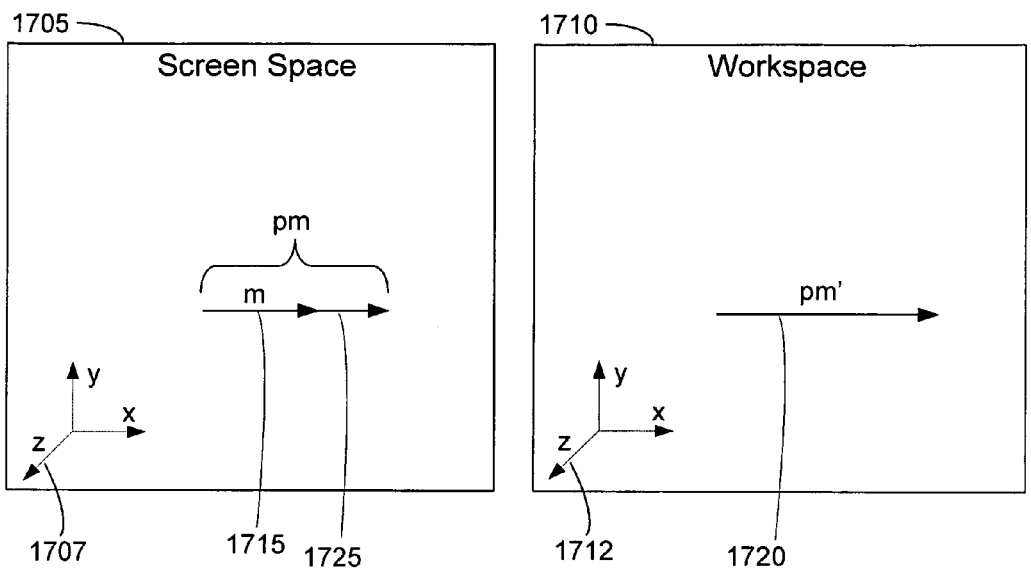

The method then aligns (at 1625) the transformed model vector with the cursor vector in the screen space (e.g., by aligning the starting points of the vectors and overlapping them). Steps 1620 and 1625 are illustrated in FIG. 17C which shows a transformed model vector 1725 in the screen space 1705 having a transformed predetermined magnitude (pm). The transformed model vector 1725 is aligned with the cursor vector 1715 in the screen space 1705.

The method 1600 then determines (at 1630) the proportion of the magnitude (m) of the cursor vector to the magnitude (pm) of the transformed model vector in the screen space. The method then determines (at 1635) a transformed cursor vector in the workspace by multiplying the model vector in the workspace with the determined proportion, the transformed cursor vector having the same direction as the model vector but with a magnitude (m') equal to the predetermined magnitude (pm') of the model vector times the determined proportion. The transformed cursor vector comprises the transform of the cursor movement in the screen space coordinate system to a cursor movement in a non-screen space coordinate system (global or local) in the workspace.

Figure 17D:
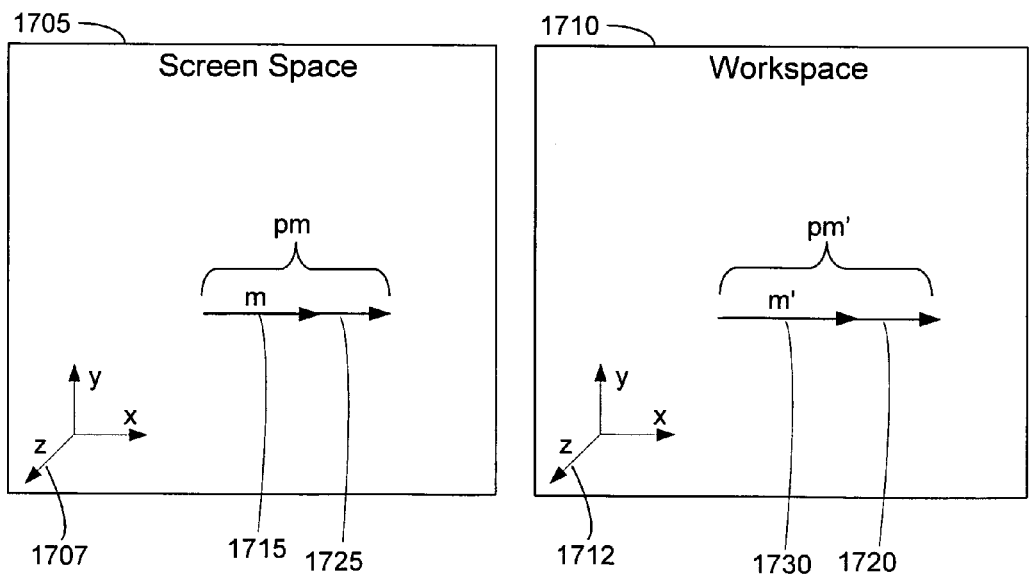

These steps are illustrated in FIG. 17D which shows that a proportion between the magnitude (m) of the cursor vector 1715 and the magnitude (pm) of the transformed model vector 1725 in the screen space 1705 is, for example, 4/7. FIG. 17D also shows a transformed cursor vector 1730 in the workspace 1710 that is determined by multiplying the model vector 1720 with the determined proportion (e.g., 4/7).

The method then applies (at 1640) the specified transform to the selected item in the workspace according to the direction and magnitude of the transformed cursor vector in the workspace. For example, if a global pan/move transform is specified, the item is moved in the direction and magnitude of the transformed cursor vector relative to the global coordinate system of the workspace. If a local pan/move transform is specified, the item is moved in the direction and magnitude of the transformed cursor vector relative to its local coordinate system. Note that after the specified transform is applied to the selected item in the workspace, the results of the specified transform in the workspace are then transformed to produce a particular view of the results in the screen space. The method 1600 then ends.

Figure 18A:
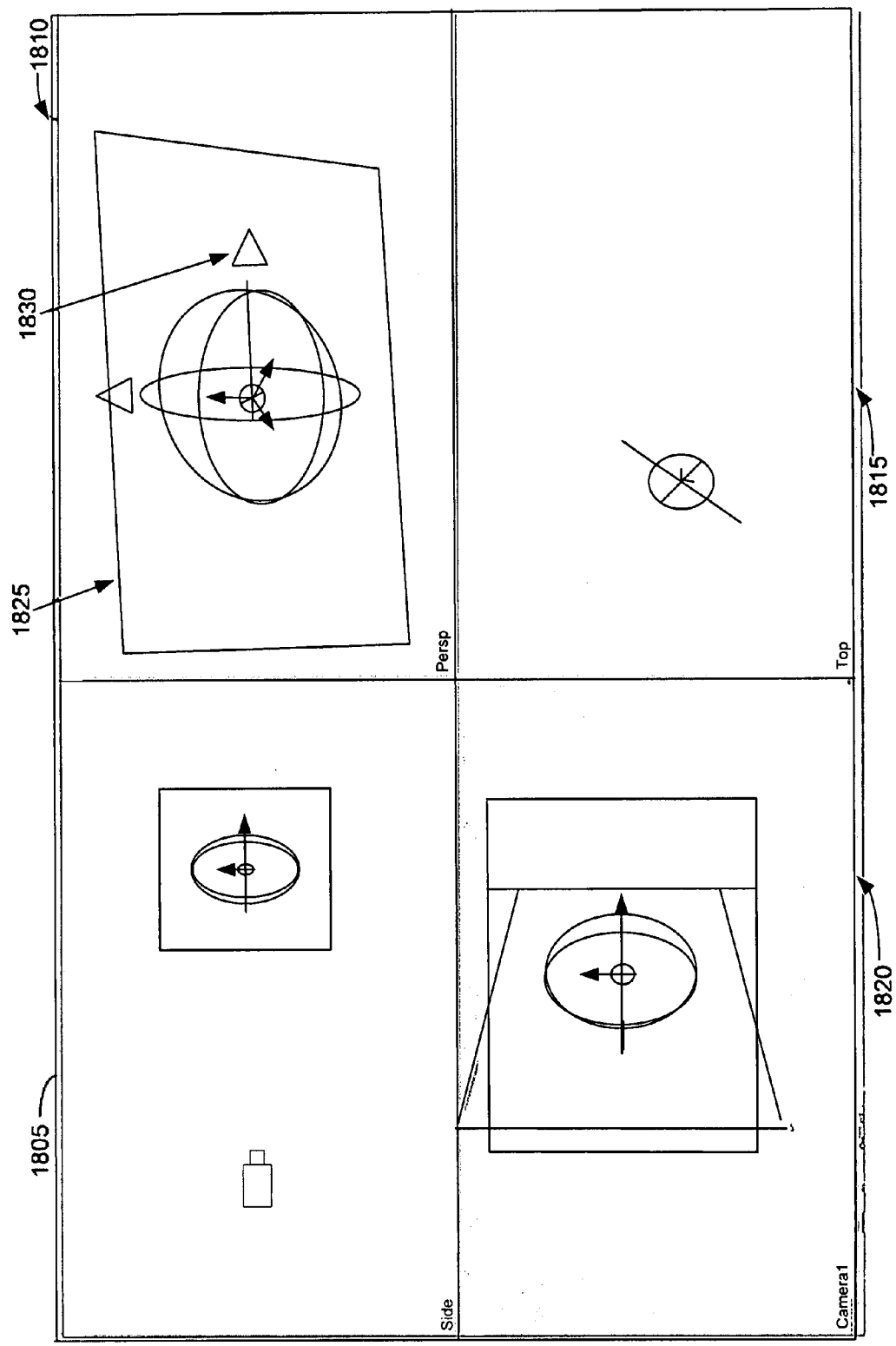
FIGS. 18A-B are screenshots of a screen space showing a workspace of a multimedia application and illustrate steps of FIG. 16.
Figure 18B:
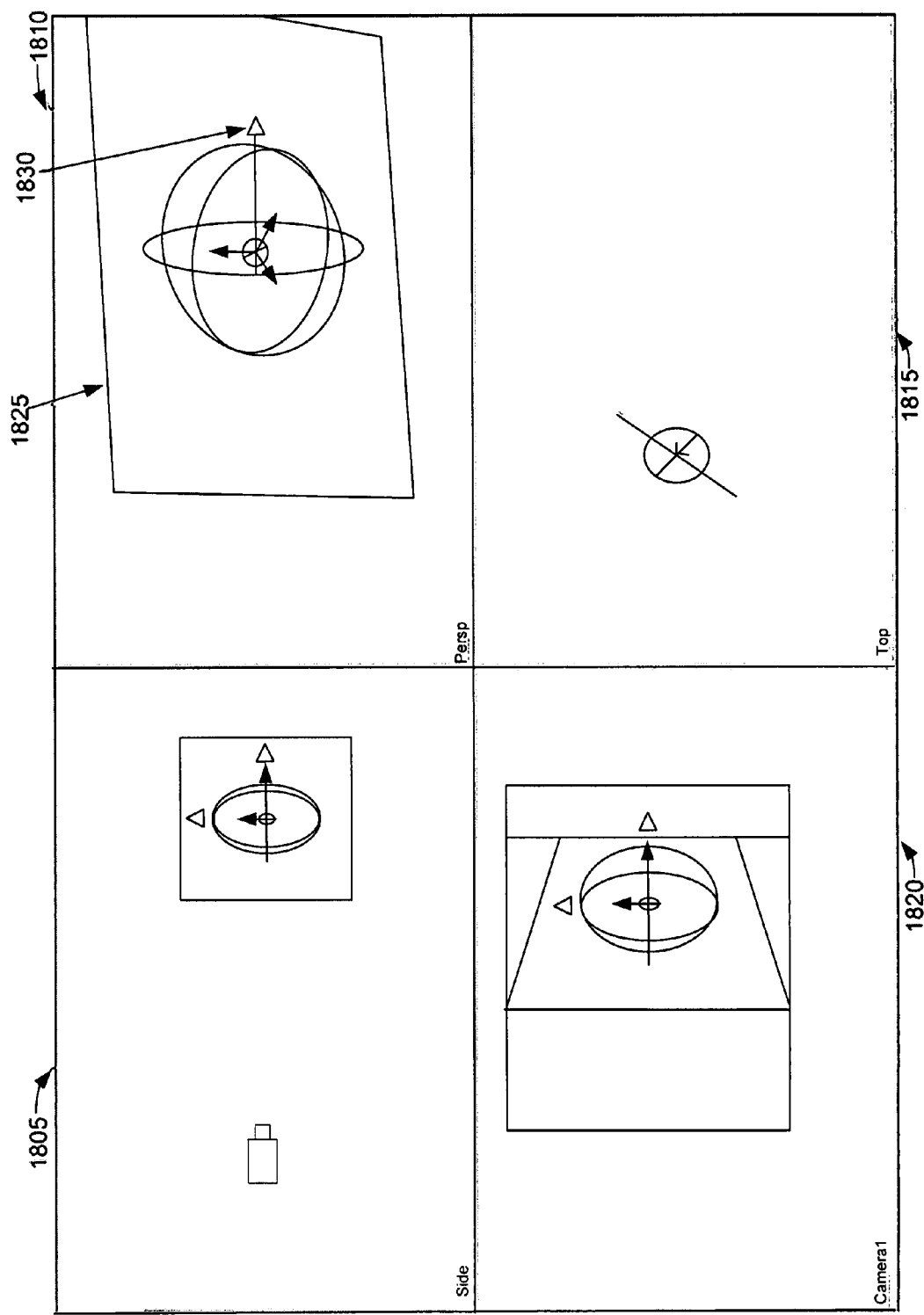

FIGS. 18A-B are screenshots of a screen space showing a workspace of a multimedia application and illustrate steps of the method 1600. These figures show a multi-pane interface having four panes. Two of the panes (upper left and lower right panes) show non-perspective views (side and top views, respectively) and two panes (upper right and lower left) show perspective views (perspective and "Camera1" views, respectively). FIGS. 18A-B are screenshots that illustrate a local pan/move transform example of the method 1600. FIG. 18A shows a side view 1805, a perspective view 1810, a top view 1815, and a "Camera1" view 1820 of a plane 1825. The plane 1825 has been selected for an X-axis local pan transform in the screen space presenting the perspective view 1810 (as indicated by the selection of the X-axis triangle 1830 in the perspective view 1810).

FIG. 18B shows that a cursor movement across the screen space presenting the perspective view 1810 has been received, the cursor movement going to the right along the X-axis of the screen space and local coordinate axes (which are substantially aligned). FIG. 18B shows that the cursor movement in the screen space coordinate system has been transformed to the local coordinate system of the plane 1825 and a local pan transform has been applied to the plane 1825 according to the transformed cursor movement. Note that after the local pan transform is applied to the plane 1825 in the workspace, the results of the transform in the workspace are then transformed to produce a perspective view of the results in the screen space.

Figure 19:
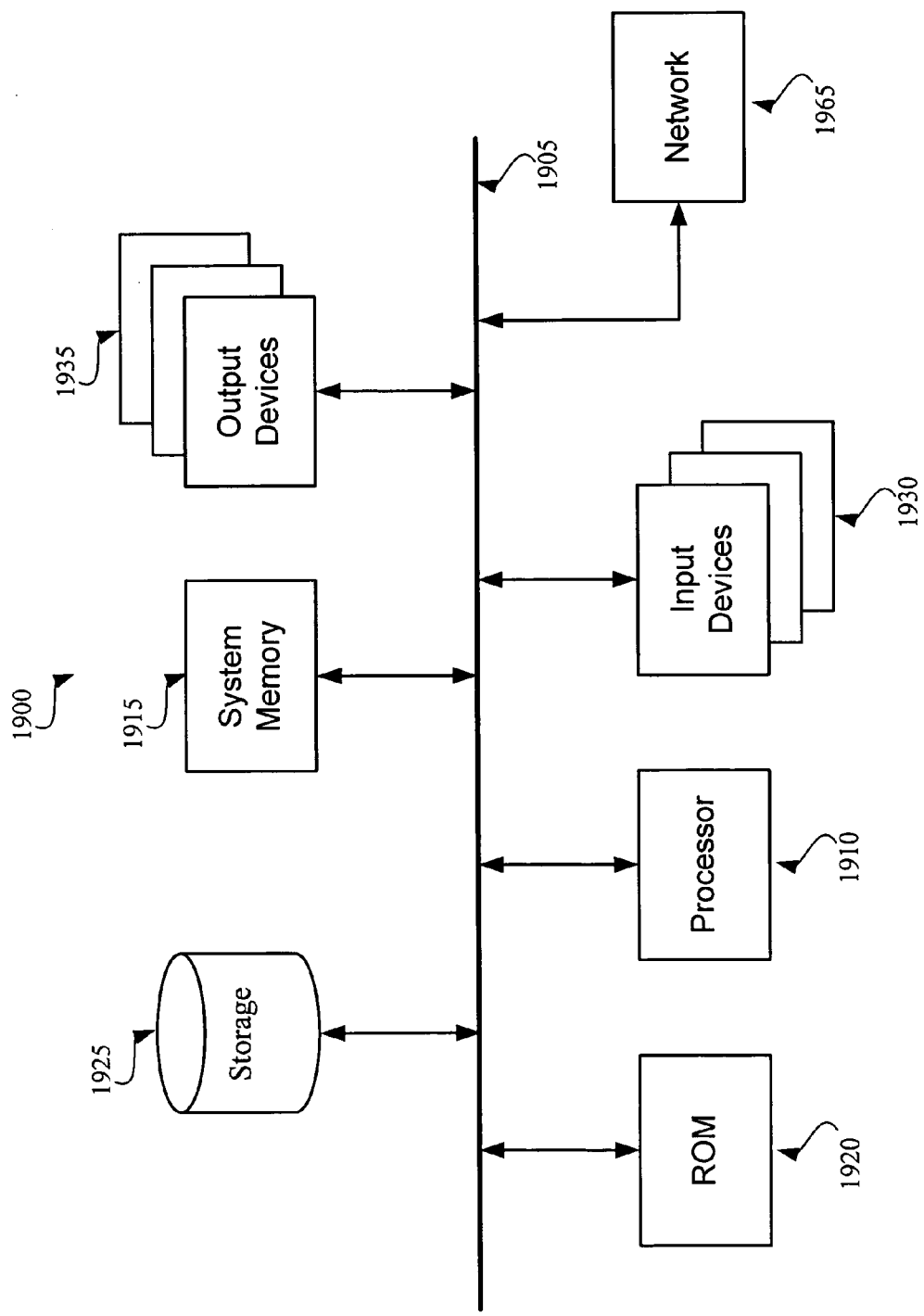
FIG. 19 presents a computer system with which some embodiments are implemented.

FIG. 19 presents a computer system 1900 with which some embodiments are implemented. The computer system 1900 includes a bus 1905, a processor 1910, a system memory 1915, a read-only memory 1920, a permanent storage device 1925, input devices 1930, and output devices 1935.

The bus 1905 collectively represents all system, peripheral, and chipset buses that communicatively connect the numerous internal devices of the computer system 1900. For instance, the bus 1905 communicatively connects the processor 1910 with the read-only memory 1920, the system memory 1915, and the permanent storage device 1925.

The read-only-memory (ROM) 1920 stores static data and instructions that are needed by the processor 1910 and other modules of the computer system. The permanent storage device 1925, on the other hand, is read-and-write memory device. This device is a non-volatile memory unit that stores instruction and data even when the computer system 1900 is off. Some embodiments use a mass-storage device (such as a magnetic or optical disk and its corresponding disk drive) as the permanent storage device 1925. Other embodiments use a removable storage device (such as a floppy disk or zip® disk, and its corresponding disk drive) as the permanent storage device.

Like the permanent storage device 1925, the system memory 1915 is a read-and-write memory device. However, unlike storage device 1925, the system memory is a volatile read-and-write memory, such as a random access memory (RAM). The system memory stores some of the instructions and data that the processor needs at runtime.

Instructions and/or data needed to perform methods of some embodiments are stored in the system memory 1915, the permanent storage device 1925, the read-only memory 1920, or any combination of the three. For example, the various memory units may contain instructions for processing multimedia items in accordance with some embodiments. From these various memory units, the processor 1910 retrieves instructions to execute and data to process in order to execute the processes of some embodiments.

The bus 1905 also connects to the input and output devices 1930 and 1935. The input devices 1930 enable a user to communicate information and select commands to the computer system 1900. For instance, the input devices 1930 enable the user to input cursor movements and information to the computer system 1900. The input devices 1930 include alphanumeric keyboards and cursor-controllers. The output devices 1935 display images generated by the computer system 1900. For instance, these devices display a user interface (e.g., graphical user interface) through which the user can interface with the computer system 1900. The output devices include printers and display devices, such as cathode ray tubes (CRT) or liquid crystal displays (LCD).

Finally, as shown in FIG. 19, the bus 1905 also couples the computer system 1900 to a network 1965 through, for example, a network adapter (not shown). In this manner, the computer system 1900 can be a part of a network of computers (such as a local area network ("LAN"), a wide area network ("WAN"), or an Intranet) or a network of networks (such as the Internet). Any or all of the components of the computer system 1900 may be used in conjunction with some embodiments. However, one of ordinary skill in the art would appreciate that any other system configuration may also be used in conjunction with other embodiments.

Several embodiments are described below by reference to compositing applications. The descriptions relating to compositing applications, however, are for illustrative purposes only and one of ordinary skill in the art will realize and that the processes of the below embodiments can be applied to any multimedia application.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for determining a depth ordering between first and second planes in a three dimensional workspace of a compositing application, the depth ordering being in relation to a reference position in the workspace, the method comprising:

projecting vectors from the reference position through predetermined points of interest on the first and second planes;

determining, for each point of interest on a particular plane, a corresponding point on the other plane that is intersected by the vector intersecting the point of interest on the particular plane;

determining a first number comprising the number of points of interest on the first plane having a depth coordinate lower than its corresponding point on the second plane and a second number comprising the number of points of interest on the second plane having a depth coordinate lower than its corresponding point on the first plane; and setting the depth ordering to reflect that the first plane is closer to the reference position if the first number is greater than the second number and setting the depth ordering to reflect that the first plane is farther from the reference position if the first number is less than the second number.

2. The method of claim 1 wherein the points of interest comprise corner and center points of the planes.

3. The method of claim 1 wherein a corresponding point on the other plane further comprises a point on the projection of the other plane that is intersected by the vector intersecting the point of interest on the particular plane.

4. The method of claim 1 further comprising:
if the first and second numbers are equal, determining a first distance comprising the distance between the center point of the first plane and its corresponding point on the second plane and a second distance comprising the distance between the center point of the second plane and its corresponding point on the first plane; and
setting the depth ordering to reflect that the first plane is closer to the reference position if the first distance is greater than the second distance and setting the depth ordering to reflect that the first plane is farther from the reference position if the first distance is less than the second distance.

5. The method of claim 4 further comprising:
if the first and second distances are equal, setting the depth ordering of the planes according to a user input.

6. The method of claim 5 further comprising:
before projecting vectors from the reference position, determining whether the first and second planes are coplanar; and
if the first and second planes are determined to be coplanar, setting the depth ordering of the planes according to a user input.

7. A computer program product having a computer readable medium having computer program instructions recorded thereon that when executed, determine a depth ordering between first and second planes in a three dimensional workspace of a compositing application, the depth ordering being in relation to a reference position in the workspace, the computer program product comprising sets of instructions for:
projecting vectors from the reference position through predetermined points of interest on the first and second planes;
determining, for each point of interest on a particular plane, a corresponding point on the other plane that is intersected by the vector intersecting the point of interest on the particular plane;
determining a first number comprising the number of points of interest on the first plane having a depth coordinate lower than its corresponding point on the second plane and a second number comprising the number of points of interest on the second plane having a depth coordinate lower than its corresponding point on the first plane; and
setting the depth ordering to reflect that the first plane is closer to the reference position if the first number is greater than the second number and setting the depth ordering to reflect that the first plane is farther from the reference position if the first number is less than the second number.

8. The computer program product of claim 7 wherein the points of interest comprise corner and center points of the planes.

9. The computer program product of claim 7 further comprising sets of instructions for:
if the first and second numbers are equal, determining a first distance comprising the distance between the center point of the first plane and its corresponding point on the second plane and a second distance comprising the distance between the center point of the second plane and its corresponding point on the first plane; and
setting the depth ordering to reflect that the first plane is closer to the reference position if the first distance is greater than the second distance and setting the depth ordering to reflect that the first plane is farther from the reference position if the first distance is less than the second distance.

\* \* \* \* \*